US012445793B2

(12) United States Patent
Arteaga et al.

(10) Patent No.: US 12,445,793 B2
(45) Date of Patent: Oct. 14, 2025

(54) AUTOMATIC LOCALIZATION OF AUDIO DEVICES

(71) Applicants: Dolby Laboratories Licensing Corporation, San Francisco, CA (US); Dolby International AB, Dublin (IE)

(72) Inventors: Daniel Arteaga, Barcelona (ES); Davide Scaini, Barcelona (ES); Mark R. P. Thomas, Walnut Creek, CA (US); Avery Bruni, San Francisco, CA (US); Olha Michelle Townsend, San Francisco, CA (US)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 277 days.

(21) Appl. No.: 18/255,554

(22) PCT Filed: Dec. 2, 2021

(86) PCT No.: PCT/US2021/061533
§ 371 (c)(1),
(2) Date: Jun. 1, 2023

(87) PCT Pub. No.: WO2022/120005
PCT Pub. Date: Jun. 9, 2022

(65) Prior Publication Data

US 2024/0022869 A1 Jan. 18, 2024

Related U.S. Application Data

(60) Provisional application No. 63/224,778, filed on Jul. 22, 2021, provisional application No. 63/203,403,
(Continued)

(30) Foreign Application Priority Data

Dec. 3, 2020 (ES) .................................. 202031212
May 20, 2021 (ES) .................................. 202130458

(51) Int. Cl.
*H04S 7/00* (2006.01)
*H04R 3/00* (2006.01)
*H04R 5/02* (2006.01)

(52) U.S. Cl.
CPC ............ *H04S 7/301* (2013.01); *H04R 3/005* (2013.01); *H04R 5/02* (2013.01); *H04S 7/303* (2013.01);
(Continued)

(58) Field of Classification Search
CPC ...... H04S 7/301; H04S 7/303; H04S 2400/15; H04R 3/005; H04R 5/02; H04R 2430/23
See application file for complete search history.

(56) References Cited

U.S. PATENT DOCUMENTS 8,682,675 B2 3/2014 Togami
8,743,658 B2 6/2014 Claussen
(Continued)

FOREIGN PATENT DOCUMENTS

JP 2020184788 A 11/2020
RU 2546717 C2 4/2015
(Continued)

OTHER PUBLICATIONS

Kozintsev, I. et al., "Position calibration of microphones and loudspeakers in distributed computing platforms", IEEE Transactions on Speech and Audio Processing, Year: 2005 vol. 13 , Issue: 1 pp. 70-83.

(Continued)

*Primary Examiner* — Andrew Sniezek

(57) ABSTRACT

A method may involve: receiving direction of arrival (DOA) data corresponding to sound emitted by at least a first smart audio device of the audio environment that includes a first audio transmitter and a first audio receiver, the DOA data corresponding to sound received by at least a second smart
(Continued)

audio device of the audio environment that includes a second audio transmitter and a second audio receiver, the DOA data corresponding to sound emitted by at least the second smart audio device and received by at least the first smart audio device; receiving one or more configuration parameters corresponding to the audio environment, to one or more audio devices, or both; and minimizing a cost function based at least in part on the DOA data and the configuration parameter(s), to estimate a position and an orientation of at least the first smart audio device and the second smart audio device.

17 Claims, 13 Drawing Sheets

Related U.S. Application Data filed on Jul. 21, 2021, provisional application No. 63/155,369, filed on Mar. 2, 2021.

(52) U.S. Cl.
CPC ...... *H04R 2430/23* (2013.01); *H04S 2400/15* (2013.01)

(56) References Cited

U.S. PATENT DOCUMENTS

| | | | | |
|---|---|---|---|---|
| 8,861,756 | B2 | 10/2014 | Zhu | |
| 8,879,741 | B2 | 11/2014 | Fukuyama | |
| 9,031,268 | B2 | 5/2015 | Fejzo | |
| 9,197,978 | B2 | 11/2015 | Usami | |
| 9,408,011 | B2 | 8/2016 | Kim | |
| 9,497,544 | B2 | 11/2016 | Mohammad | |
| 9,549,253 | B2 | 1/2017 | Alexandridis | |
| 9,609,141 | B2 | 3/2017 | Beaucoup | |
| 9,788,119 | B2 | 10/2017 | Vilermo | |
| 9,788,120 | B2 | 10/2017 | Miyasaka | |
| 9,971,012 | B2 | 5/2018 | Nakamura | |
| 10,270,642 | B2 | 4/2019 | Zhang | |
| 10,331,396 | B2 | 6/2019 | Habets | |
| 10,748,544 | B2 | 8/2020 | Nakadai | |
| 2010/0217590 | A1 | 8/2010 | Nemer | |
| 2011/0091055 | A1 | 4/2011 | Leblanc | |
| 2016/0241955 | A1 | 8/2016 | Thyssen | |
| 2018/0299527 | A1 | 10/2018 | Helwani | |
| 2019/0132685 | A1 | 5/2019 | Skoglund | |
| 2019/0253801 | A1 | 8/2019 | Arteaga | |
| 2019/0355373 | A1 | 11/2019 | Nesta | |
| 2020/0066295 | A1 | 2/2020 | Karimian-Azari | |
| 2020/0288262 | A1 | 9/2020 | Eronen | |
| 2023/0040846 | A1 | 2/2023 | Thomas | |
| 2025/0008262 | A1 * | 1/2025 | Bruni | H04R 1/26 |

FOREIGN PATENT DOCUMENTS

| | | | |
|---|---|---|---|
| RU | 2734231 | C1 | 10/2020 |
| WO | 2018029341 | A1 | 2/2018 |
| WO | 2019078816 | A1 | 4/2019 |
| WO | 2020210084 | A1 | 10/2020 |

OTHER PUBLICATIONS

Nadiri, O. et al.; "Localization of Multiple Speakers Under High Reverberation Using a Spherical Microphone Array and the Direct-Path Dominance Test"; Oct. 2014; IEEE/ACM Transactions on Audio, Speech, and Language Processing; vol. 22; No. 10; pp. 1494-1505.

Tashev, Ivan J. et al; "Cost Function for Sound Source Localization With Arbitrary Microphone Arrays"; 2017; IEEE; Hands-free Speech Communications and Microphone Arrays (HSCMA); pp. 74-80.

Tehrani, Ali Kafaei et al.; "Sound Source Localization Using Time Differences of Arrival; Euclidean Distance Matrices Based Approach"; 2018; 9th International Symposium on Telecommunications; p. 91-95.

* cited by examiner

800C

AUTOMATIC LOCALIZATION OF AUDIO DEVICES

CROSS REFERENCE TO RELATED APPLICATIONS

This application is a U.S. National Stage of International Application No. PCT/US2021/061533, filed Dec. 2, 2021, which claims priority to Spanish Patent Application Nos. P202031212, filed 3 Dec. 2020, and P202130458, filed, 20 May 2021, and U.S. provisional application Nos. 63/155,369, filed 2 Mar. 2021, 63/203,403, filed 21 Jul. 2021 and 63/224,778 filed 22 Jul. 2021, all of which are incorporated herein by reference in their entirety.

TECHNICAL FIELD

This disclosure pertains to systems and methods for automatically locating audio devices.

BACKGROUND

Audio devices, including but not limited to smart audio devices, have been widely deployed and are becoming common features of many homes. Although existing systems and methods for locating audio devices provide benefits, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, “wakeword” is used in a broad sense to denote any sound (e.g., a word uttered by a human, or some other sound), where a smart audio device is configured to awake in response to detection of (“hearing”) the sound (using at least one microphone included in or coupled to the smart audio device, or at least one other microphone). In this context, to “awake” denotes that the device enters a state in which it awaits (in other words, is listening for) a sound command. In some instances, what may be referred to herein as a “wakeword” may include more than one word, e.g., a phrase.

Herein, the expression “wakeword detector” denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an “awakened” state or a state of “attentiveness”) in which it listens for a command and passes on a received command to a larger, more computationally-intensive recognizer.

As used herein, the terms “program stream” and “content stream” refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via methods. Some such methods may involve audio device location. For example, some methods may involve localizing audio devices in an audio environment. Some such methods may involve obtaining, by a control system, direction of arrival (DOA) data corresponding to sound emitted by at least a first smart audio device of the audio environment. In some implementations, the first smart audio device may include a first audio transmitter and a first audio receiver. In some examples, the DOA data may correspond to sound received by at least a second smart audio device of the audio environment. In some instances, the second smart audio device may include a second audio transmitter and a second audio receiver. In some examples, the DOA data may also correspond to sound emitted by at least the second smart audio device and received by at least the first smart audio device.

Some such methods may involve receiving, by the control system, configuration parameters. In some examples, the configuration parameters may correspond to the audio environment and/or may correspond to one or more audio devices of the audio environment. Some such methods may involve minimizing, by the control system, a cost function based at least in part on the DOA data and the configuration parameters, to estimate a position and/or an orientation of at least the first smart audio device and the second smart audio device.

According to some examples, the DOA data also may correspond to sound received by one or more passive audio receivers of the audio environment. In some examples, each of the one or more passive audio receivers may include a microphone array but, in some instances, may lack an audio emitter. In some such examples, minimizing the cost function also may provide an estimated location and orientation of each of the one or more passive audio receivers.

In some examples, the DOA data also may correspond to sound emitted by one or more audio emitters of the audio environment. In some instances, each of the one or more audio emitters may include at least one sound-emitting transducer but may, in some instances, lack a microphone array. In some such examples, minimizing the cost function also may provide an estimated location of each of the one or more audio emitters.

In some implementations, the DOA data also may correspond to sound emitted by third through $N^{th}$ smart audio devices of the audio environment, N corresponding to a total number of smart audio devices of the audio environment. In some examples, the DOA data also may correspond to sound received by each of the first through $N^{th}$ smart audio devices from all other smart audio devices of the audio environment. In some such examples, minimizing the cost function may involve estimating a position and/or an orientation of the third through $N^{th}$ smart audio devices.

According to some examples, the configuration parameters may include a number of audio devices in the audio environment, one or more dimensions of the audio environment, and/or one or more constraints on audio device location and/or orientation. In some instances, the configuration parameters may include disambiguation data for rotation, translation and/or scaling.

Some methods may involve receiving, by the control system, a seed layout for the cost function. The seed layout may, in some examples, specify a correct number of audio transmitters and receivers in the audio environment and an arbitrary location and orientation for each of the audio transmitters and receivers in the audio environment.

Some methods may involve receiving, by the control system, a weight factor associated with one or more elements of the DOA data. The weight factor may, for example, indicate at the availability and/or reliability of the one or more elements of the DOA data.

Some methods may involve obtaining, by the control system, one or more elements of the DOA data using a beamforming method, a steered power response method, a time difference of arrival method, a structured signal method, or combinations thereof.

Some methods may involve receiving, by the control system, time of arrival (TOA) data corresponding to sound emitted by at least one audio device of the audio environment and received by at least one other audio device of the audio environment. In some such examples, the cost function may be based, at least in part, on the TOA data. Some such methods may involve estimating at least one playback latency and/or estimating at least one recording latency. In some examples, the cost function may operates with a rescaled position, a rescaled latency and/or a rescaled time of arrival.

According to some examples, the cost function may include a first term depending on the DOA data only. In some such examples, the cost function may include a second term depending on the TOA data only. In some such examples, the first term may include a first weight factor and the second term may include a second weight factor. In some instances, one or more TOA elements of the second term may have a TOA element weight factor indicating the availability and/or reliability of each of the one or more TOA elements.

In some examples, the configuration parameters may include playback latency data, recording latency data, data for disambiguating latency symmetry, disambiguation data for rotation, disambiguation data for translation, disambiguation data for scaling, and/or one or more combinations thereof.

Some other aspects of the present disclosure may be implemented via methods. Some such methods may involve device location. For example, some methods may involve localizing devices in an audio environment. Some such methods may involve obtaining, by a control system, direction of arrival (DOA) data corresponding to transmissions of at least a first transceiver of a first device of the environment. The first transceiver may, in some examples, include a first transmitter and a first receiver. In some instances, the DOA data may correspond to transmissions received by at least a second transceiver of a second device of the environment. In some examples, the second transceiver may include a second transmitter and a second receiver. In some instances, the DOA data may correspond to transmissions from at least the second transceiver received by at least the first transceiver.

In some examples, the first device and the second device may be audio devices and the environment may be an audio environment. According to some such examples, the first transmitter and the second transmitter may be audio transmitters. In some such examples, the first receiver and the second receiver may be audio receivers. In some implementations, the first transceiver and the second transceiver may be configured for transmitting and receiving electromagnetic waves.

Some such methods may involve receiving, by the control system, configuration parameters. In some instances, the configuration parameters may correspond to the environment, and/or may correspond to one or more devices of the environment. Some such methods may involve minimizing, by the control system, a cost function based at least in part on the DOA data and the configuration parameters, to estimate a position and/or an orientation of at least the first device and the second device.

In some examples, the DOA data also may correspond to transmissions received by one or more passive receivers of the environment. Each of the one or more passive receivers may, for example, include a receiver array but may lack a transmitter. In some such examples, minimizing the cost function also may provide an estimated location and/or orientation of each of the one or more passive receivers.

According to some examples, the DOA data also may correspond to transmissions from one or more transmitters of the environment. In some instances, each of the one or more transmitters may lack a receiver array. In some such examples, minimizing the cost function also may provide an estimated location of each of the one or more transmitters.

In some examples, the DOA data also may correspond to transmissions emitted by third through $N^{th}$ transceivers of third through $N^{th}$ devices of the environment, N corresponding to a total number of transceivers of the environment. In some such examples, the DOA data also may correspond to transmissions received by each of the first through $N^{th}$ transceivers from all other transceivers of the environment. In some such examples, minimizing the cost function may involve estimating a position and/or an orientation of the third through $N^{th}$ transceivers.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some examples, the apparatus may be one of the above-referenced audio devices. However, in some implementations the apparatus may be another type of device, such as a mobile device, a laptop, a server, etc.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
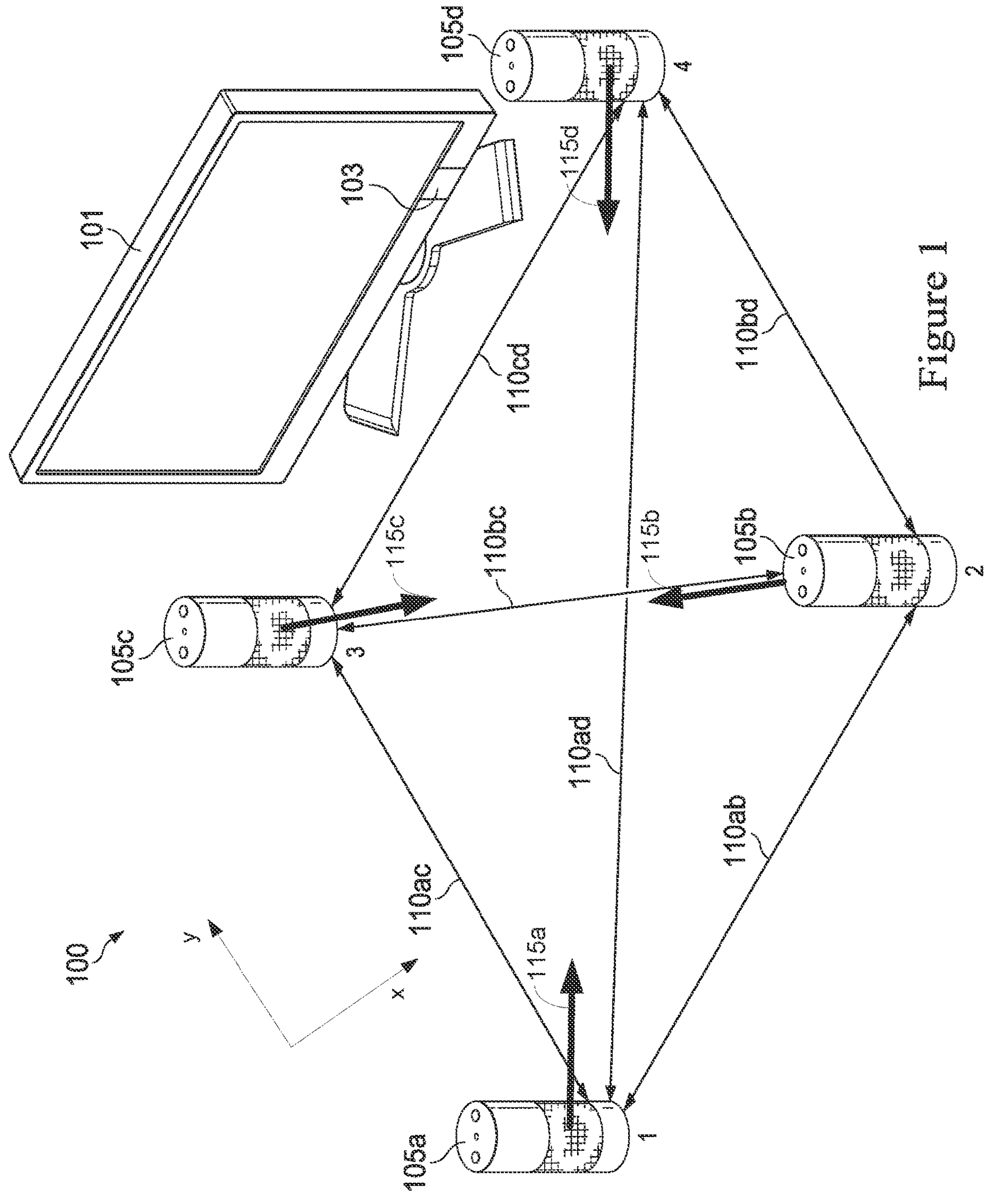
FIG. 1 shows an example of geometric relationships between four audio devices in an environment.

The advent of smart speakers, incorporating multiple drive units and microphone arrays, in addition to existing audio devices including televisions and sound bars, and new microphone and loudspeaker-enabled connected devices such as lightbulbs and microwaves, creates a problem in which dozens of microphones and loudspeakers need locating relative to one another in order to achieve orchestration. Audio devices cannot be assumed to lie in canonical layouts (such as a discrete Dolby 5.1 loudspeaker layout). In some instances, the audio devices in an environment may be randomly located, or at least may be distributed within the environment in an irregular and/or asymmetric manner.

Moreover, audio devices cannot be assumed to be homogeneous or synchronous. As used herein, audio devices may be referred to as "synchronous" or "synchronized" if sounds are detected by, or emitted by, the audio devices according to the same sample clock, or synchronized sample clocks. For example, a first synchronized microphone of a first audio device within an environment may digitally sample audio data according to a first sample clock and a second microphone of a second synchronized audio device within the environment may digitally sample audio data according to the first sample clock. Alternatively, or additionally, a first synchronized speaker of a first audio device within an environment may emit sound according to a speaker set-up clock and a second synchronized speaker of a second audio device within the environment may emit sound according to the speaker set-up clock.

Some previously-disclosed methods for automatic speaker location require synchronized microphones and/or speakers. For example, some previously-existing tools for device localization rely upon sample synchrony between all microphones in the system, requiring known test stimuli and passing full-bandwidth audio data between sensors.

The present assignee has produced several speaker localization techniques for cinema and home that are excellent solutions in the use cases for which they were designed. Some such methods are based on time-of-flight derived from impulse responses between a sound source and microphone(s) that are approximately co-located with each loudspeaker. While system latencies in the record and playback chains may also be estimated, sample synchrony between clocks is required along with the need for a known test stimulus from which to estimate impulse responses.

Recent examples of source localization in this context have relaxed constraints by requiring intra-device microphone synchrony but not requiring inter-device synchrony. Additionally, some such methods relinquish the need for passing audio between sensors by low-bandwidth message passing such as via detection of the time of arrival (TOA, also referred to as "time of flight") of a direct (non-reflected) sound or via detection of the dominant direction of arrival (DOA) of a direct sound. Each approach has some potential advantages and potential drawbacks. For example, some previously-deployed TOA methods can determine device geometry up to an unknown translation, rotation, and reflection about one of three axes. Rotations of individual devices are also unknown if there is just one microphone per device. Some previously-deployed DOA methods can determine device geometry up to an unknown translation, rotation, and scale. While some such methods may produce satisfactory results under ideal conditions, the robustness of such methods to measurement error has not been demonstrated.

Some of the embodiments disclosed in this application allow for the localization of a collection of smart audio devices based on 1) the DOA between each pair of audio devices in an audio environment, and 2) the minimization of a non-linear optimization problem designed for input of data type 1). Other embodiments disclosed in the application allow for the localization of a collection of smart audio devices based on 1) the DOA between each pair of audio devices in the system, 2) the TOA between each pair of devices, and 3) the minimization of a non-linear optimization problem designed for input of data types 1) and 2).

FIG. 1 shows an example of geometric relationships between four audio devices in an environment. In this example, the audio environment 100 is a room that includes a television 101 and audio devices 105*a*, 105*b*, 105*c* and 105*d*. According to this example, the audio devices 105*a*-105*d* are in locations 1 through 4, respectively, of the audio environment 100. As with other examples disclosed herein, the types, numbers, locations and orientations of elements shown in FIG. 1 are merely made by way of example. Other implementations may have different types, numbers and arrangements of elements, e.g., more or fewer audio devices, audio devices in different locations, audio devices having different capabilities, etc.

In this implementation, each of the audio devices 105*a*-105*d* is a smart speaker that includes a microphone system and a speaker system that includes at least one speaker. In some implementations, each microphone system includes an array of at least three microphones. According to some implementations, the television 101 may include a speaker system and/or a microphone system. In some such implementations, an automatic localization method may be used to automatically localize the television 101, or a portion of the television 101 (e.g., a television loudspeaker, a television transceiver, etc.), e.g., as described below with reference to the audio devices 105*a*-105*d*.

Some of the embodiments described in this disclosure allow for the automatic localization of a set of audio devices, such as the audio devices 105*a*-105*d* shown in FIG. 1, based on either the direction of arrival (DOA) between each pair of audio devices, the time of arrival (TOA) of the audio signals between each pair of devices, or both the DOA and the TOA of the audio signals between each pair of devices. In some instances, as in the example shown in FIG. 1, each of the audio devices is enabled with at least one driving unit and one microphone array, the microphone array being capable of providing the direction of arrival of an incoming sound. According to this example, the two-headed arrow 110*ab* represents sound transmitted by the audio device 105*a* and received by the audio device 105*b*, as well as sound transmitted by the audio device 105*b* and received by the audio device 105*a*. Similarly, the two-headed arrows 110*ac*, 110*ad*, 110*bc*, 110*bd*, and 110*cd* represent sounds transmitted and received by audio devices 105*a* and audio device 105*c*, sounds transmitted and received by audio devices 105*a* and audio device 105*d*, sounds transmitted and received by audio devices 105*b* and audio device 105*c*, sounds transmitted and received by audio devices 105*b* and audio device 105*d*, and sounds transmitted and received by audio devices 105*c* and audio device 105*d*, respectively.

In this example, each of the audio devices 105*a*-105*d* has an orientation, represented by the arrows 115*a*-115*d*, which may be defined in various ways. For example, the orientation of an audio device having a single loudspeaker may correspond to a direction in which the single loudspeaker is facing. In some examples, the orientation of an audio device having multiple loudspeakers facing in different directions may be indicated by a direction in which one of the loudspeakers is facing. In other examples, the orientation of an audio device having multiple loudspeakers facing in different directions may be indicated by the direction of a vector corresponding to the sum of audio output in the different directions in which each of the multiple loudspeakers is facing. In the example shown in FIG. 1, the orientations of the arrows 115*a*-115*d* are defined with reference to a Cartesian coordinate system. In other examples, the orientations of the arrows 115*a*-115*d* may be defined with reference to another type of coordinate system, such as a spherical or cylindrical coordinate system.

In this example, the television 101 includes an electromagnetic interface 103 that is configured to receive electromagnetic waves. In some examples, the electromagnetic interface 103 may be configured to transmit and receive electromagnetic waves. According to some implementations, at least two of the audio devices 105*a*-105*d* may include an antenna system configured as a transceiver. The antenna system may be configured to transmit and receive electromagnetic waves. In some examples, the antenna system includes an antenna array having at least three antennas. Some of the embodiments described in this disclosure allow for the automatic localization of a set of devices, such as the audio devices 105*a*-105*d* and/or the television 101 shown in FIG. 1, based at least in part on the DOA of electromagnetic waves transmitted between devices. Accordingly, the two-headed arrows 110*ab*, 110*ac*, 110*ad*, 110*bc*, 110*bd*, and 110*cd* also may represent electromagnetic waves transmitted between the audio devices 105*a*-105*d*.

According to some examples, the antenna system of a device (such as an audio device) may be co-located with a loudspeaker of the device, e.g., adjacent to the loudspeaker. In some such examples, an antenna system orientation may correspond with a loudspeaker orientation. Alternatively, or additionally, the antenna system of a device may have a known or predetermined orientation with respect to one or more loudspeakers of the device.

In this example, the audio devices 105*a*-105*d* are configured for wireless communication with one another and with other devices. In some examples, the audio devices 105*a*-105*d* may include network interfaces that are configured for communication between the audio devices 105*a*-105*d* and other devices via the Internet. In some implementations, the automatic localization processes disclosed herein may be performed by a control system of one of the audio devices 105*a*-105*d*. In other examples, the automatic localization processes may be performed by another device of the audio environment 100, such as what may sometimes be referred to as a smart home hub, that is configured for wireless communication with the audio devices 105*a*-105*d*. In other examples, the automatic localization processes may be performed, at least in part, by a device outside of the audio environment 100, such as a server, e.g., based on information received from one or more of the audio devices 105*a*-105*d* and/or a smart home hub.

Figure 2:
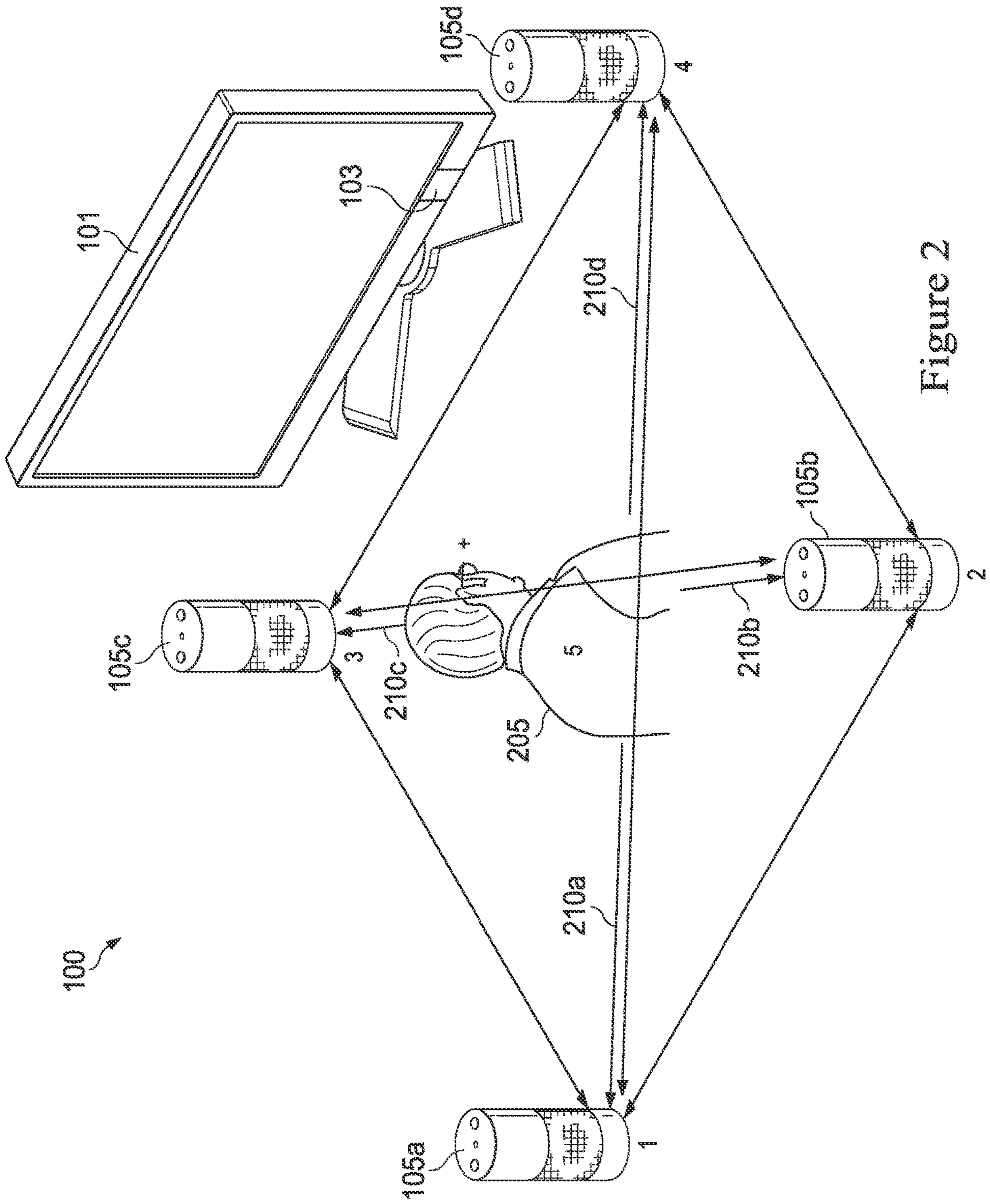
FIG. 2 shows an audio emitter located within the audio environment of FIG. 1.

FIG. 2 shows an audio emitter located within the audio environment of FIG. 1. Some implementations provide automatic localization of one or more audio emitters, such as the person 205 of FIG. 2. In this example, the person 205 is at location 5. Here, sound emitted by the person 205 and received by the audio device 105*a* is represented by the single-headed arrow 210*a*. Similarly, sounds emitted by the person 205 and received by the audio devices 105*b*, 105*c* and 105*d* are represented by the single-headed arrows 210*b*, 210*c* and 210*d*. Audio emitters can be localized based on either the DOA of the audio emitter sound as captured by the audio devices 105*a*-105*d* and/or the television 101, based on the differences in TOA of the audio emitter sound as measured by the audio devices 105*a*-105*d* and/or the television 101, or based on both the DOA and the differences in TOA.

Alternatively, or additionally, some implementations may provide automatic localization of one or more electromagnetic wave emitters. Some of the embodiments described in this disclosure allow for the automatic localization of one or more electromagnetic wave emitters, based at least in part on the DOA of electromagnetic waves transmitted by the one or more electromagnetic wave emitters. If an electromagnetic wave emitter were at location 5, electromagnetic waves emitted by the electromagnetic wave emitter and received by the audio devices 105*a*, 105*b*, 105*c* and 105*d* also may be represented by the single-headed arrows 210*a*, 210*b*, 210*c* and 210*c*.

Figure 3:
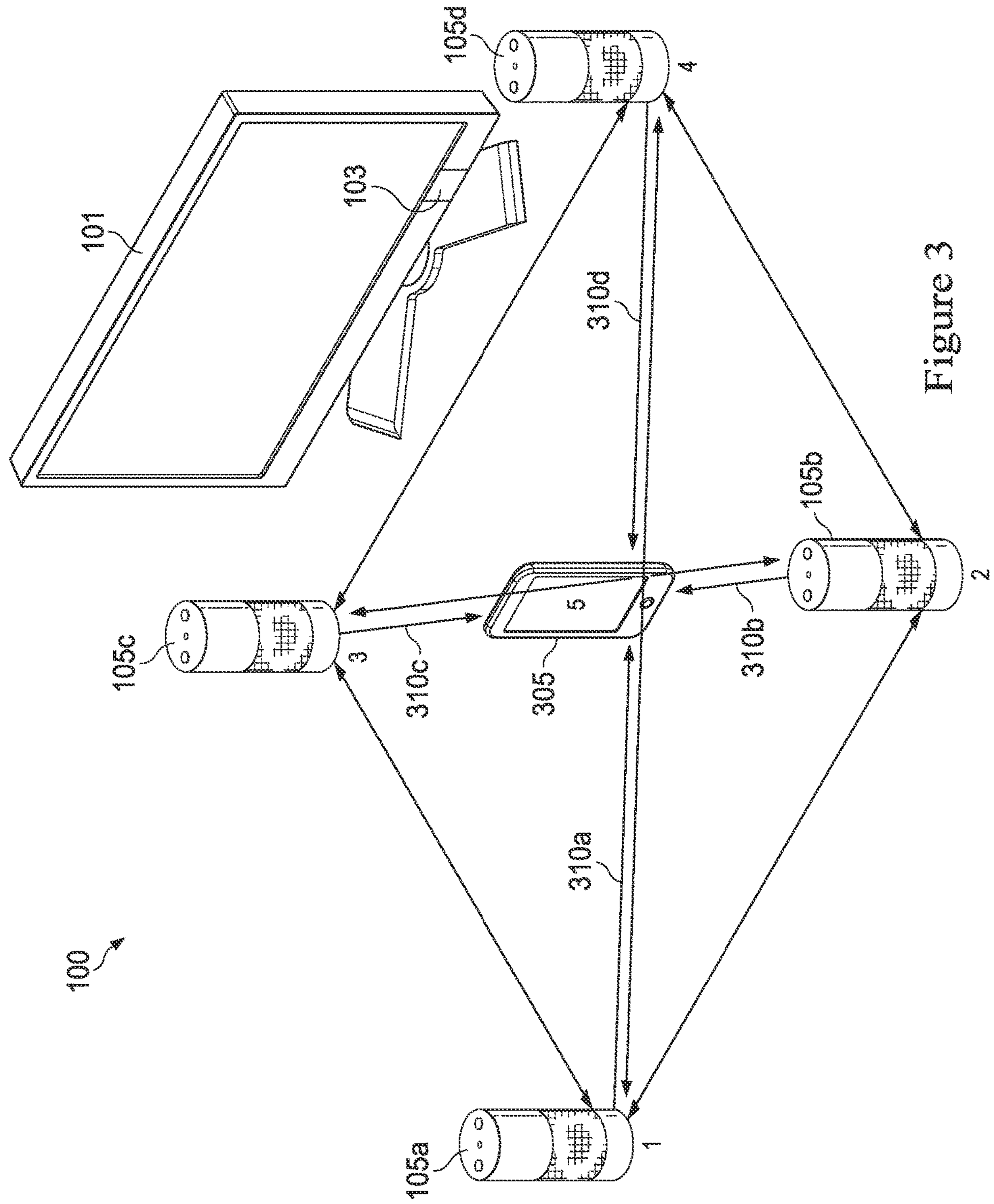
FIG. 3 shows an audio receiver located within the audio environment of FIG. 1.

FIG. 3 shows an audio receiver located within the audio environment of FIG. 1. In this example, the microphones of a smartphone 305 are enabled, but the speakers of the smartphone 305 are not currently emitting sound. Some embodiments provide automatic localization one or more passive audio receivers, such as the smartphone 305 of FIG. 3 when the smartphone 305 is not emitting sound. Here, sound emitted by the audio device 105*a* and received by the smartphone 305 is represented by the single-headed arrow 310*a*. Similarly, sounds emitted by the audio devices 105*b*, 105*c* and 105*d* and received by the smartphone 305 are represented by the single-headed arrows 310*b*, 310*c* and 310*d*.

If the audio receiver is equipped with a microphone array and is configured to determine the DOA of received sound, the audio receiver may be localized based, at least in part, on the DOA of sounds emitted by the audio devices 105*a*-105*d* and captured by the audio receiver. In some examples, the audio receiver may be localized based, at least in part, on the difference in TOA of the smart audio devices as captured by the audio receiver, regardless of whether the audio receiver is equipped with a microphone array. Yet other embodiments may allow for the automatic localization of a set of smart audio devices, one or more audio emitters, and one or more receivers, based on DOA only or DOA and TOA, by combining the methods described above.

Direction of Arrival Localization

Figure 4:
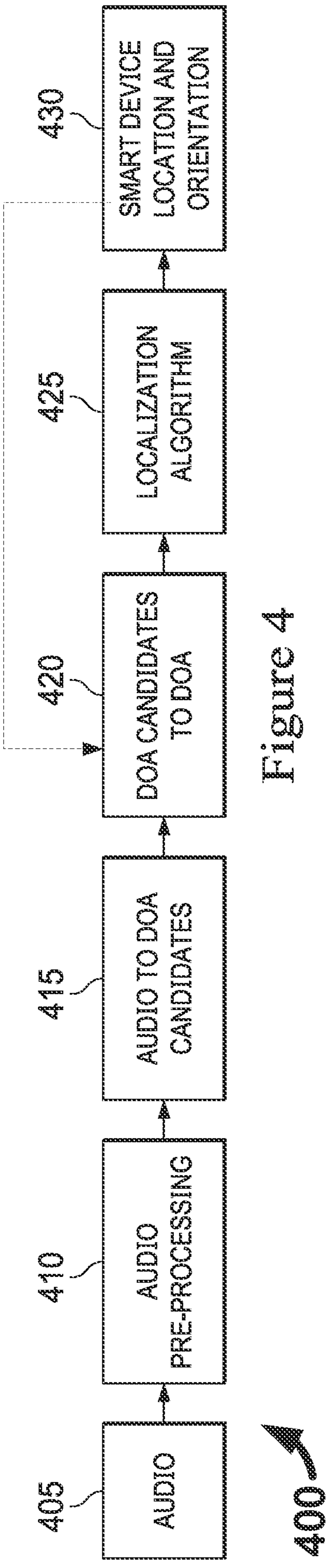
FIG. 4 is a flow diagram that outlines one example of a method that may be performed by a control system of an apparatus such as that shown in FIG. 10.
Figure 10:
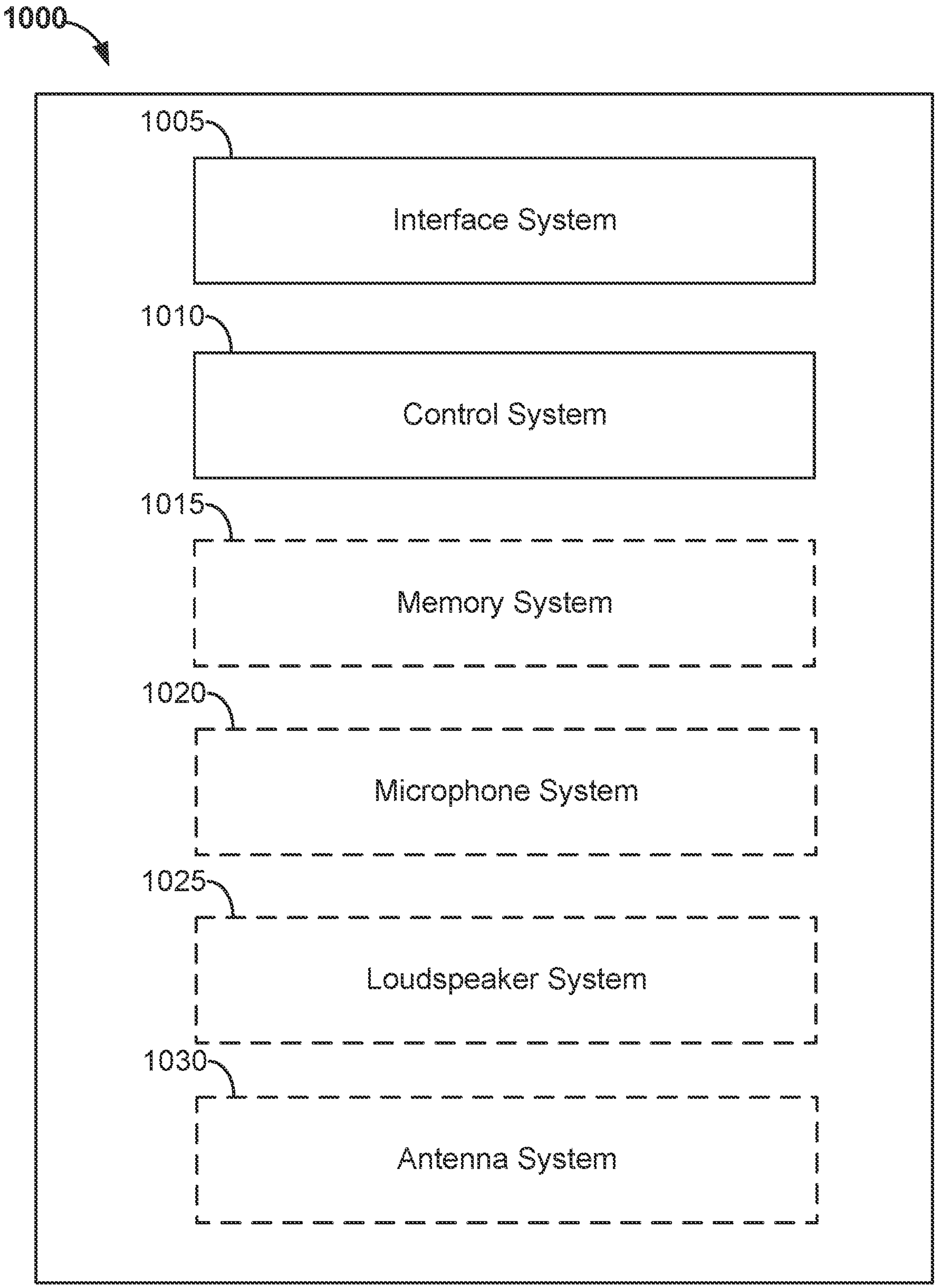
FIG. 10 is a block diagram that shows examples of components of an apparatus capable of implementing various aspects of this disclosure.

FIG. 4 is a flow diagram that outlines one example of a method that may be performed by a control system of an apparatus such as that shown in FIG. 10. The blocks of method 400, like other methods described herein, are not necessarily performed in the order indicated. Moreover, such methods may include more or fewer blocks than shown and/or described.

Method 400 is an example of an audio device localization process. In this example, method 400 involves determining the location and orientation of two or more smart audio devices, each of which includes a loudspeaker system and an array of microphones. According to this example, method

400 involves determining the location and orientation of the smart audio devices based at least in part on the audio emitted by every smart audio device and captured by every other smart audio device, according to DOA estimation. In this example, the initial blocks of method 400 rely on the control system of each smart audio device to be able to extract the DOA from the input audio obtained by that smart audio device's microphone array, e.g., by using the time differences of arrival between individual microphone capsules of the microphone array.

In this example, block 405 involves obtaining the audio emitted by every smart audio device of an audio environment and captured by every other smart audio device of the audio environment. In some such examples, block 405 may involve causing each smart audio device to emit a sound, which in some instances may be a sound having a predetermined duration, frequency content, etc. This predetermined type of sound may be referred to herein as a structured source signal. In some implementations, the smart audio devices may be, or may include, the audio devices 105*a*-105*d* of FIG. 1.

In some such examples, block 405 may involve a sequential process of causing a single smart audio device to emit a sound while the other smart audio devices "listen" for the sound. For example, referring to FIG. 1, block 405 may involve: (a) causing the audio device 105*a* to emit a sound and receiving microphone data corresponding to the emitted sound from microphone arrays of the audio devices 105*b*-105*d*; then (b) causing the audio device 105*b* to emit a sound and receiving microphone data corresponding to the emitted sound from microphone arrays of the audio devices 105*a*, 105*c* and 105*d*; then (c) causing the audio device 105*c* to emit a sound and receiving microphone data corresponding to the emitted sound from microphone arrays of the audio devices 105*a*, 105*b* and 105*d*; then (d) causing the audio device 105*d* to emit a sound and receiving microphone data corresponding to the emitted sound from microphone arrays of the audio devices 105*a*, 105*b* and 105*c*. The emitted sounds may or may not be the same, depending on the particular implementation.

In other examples, block 405 may involve a simultaneous process of causing all smart audio devices to emit a sound while the other smart audio devices "listen" for the sound. For example, block 405 may involve performing the following steps simultaneously: (1) causing the audio device 105*a* to emit a first sound and receiving microphone data corresponding to the emitted first sound from microphone arrays of the audio devices 105*b*-105*d*; (2) causing the audio device 105*b* to emit a second sound different from the first sound and receiving microphone data corresponding to the emitted second sound from microphone arrays of the audio devices 105*a*, 105*c* and 105*d*; (3) causing the audio device 105*c* to emit a third sound different from the first sound and the second sound, and receiving microphone data corresponding to the emitted third sound from microphone arrays of the audio devices 105*a*, 105*b* and 105*d*; (4) causing the audio device 105*d* to emit a fourth sound different from the first sound, the second sound and the third sound, and receiving microphone data corresponding to the emitted fourth sound from microphone arrays of the audio devices 105*a*, 105*b* and 105*c*.

In this example, block 410 involves a process of pre-processing the audio signals obtained via the microphones. Block 410 may, for example, involve applying one or more filters, a noise or echo suppression process, etc. Some additional pre-processing examples are described below.

According to this example, block 415 involves determining DOA candidates from the pre-processed audio signals resulting from block 410. For example, if block 405 involved emitting and receiving structured source signals, block 415 may involve one or more deconvolution methods to yield impulse responses and/or "pseudo ranges," from which the time difference of arrival of dominant peaks can be used, in conjunction with the known microphone array geometry of the smart audio devices, to estimate DOA candidates.

However, not all implementations of method 400 involve obtaining microphone signals based on the emission of predetermined sounds. Accordingly, some examples of block 415 include "blind" methods that are applied to arbitrary audio signals, such as steered response power, receiver-side beamforming, or other similar methods, from which one or more DOAs may be extracted by peak-picking. Some examples are described below. It will be appreciated that while DOA data may be determined via blind methods or using structured source signals, in most instances TOA data may only be determined using structured source signals. Moreover, more accurate DOA information may generally be obtained using structured source signals.

According to this example, block 420 involves selecting one DOA corresponding to the sound emitted by each of the other smart audio devices. In many instances, a microphone array may detect both direct arrivals and reflected sound that was transmitted by the same audio device. Block 420 may involve selecting the audio signals that are most likely to correspond to directly transmitted sound. Some additional examples of determining DOA candidates and of selecting a DOA from two or more candidate DOAs are described below.

In this example, block 425 involves receiving DOA information resulting from each smart audio device's implementation of block 420 (in other words, receiving a set of DOAs corresponding to sound transmitted from every smart audio device to every other smart audio device in the audio environment) and performing a localization method (e.g., implementing a localization algorithm via a control system) based on the DOA information. In some disclosed implementations, block 425 involves minimizing a cost function, possibly subject to some constraints and/or weights, e.g., as described below with reference to FIG. 5. In some such examples, the cost function receives as input data the DOA values from every smart audio device to every other smart device and returns as outputs the estimated location and the estimated orientation of each of the smart audio devices. In the example shown in FIG. 4, block 430 represents the estimated smart audio device locations and the estimated smart audio device orientations produced in block 425.

Figure 5:
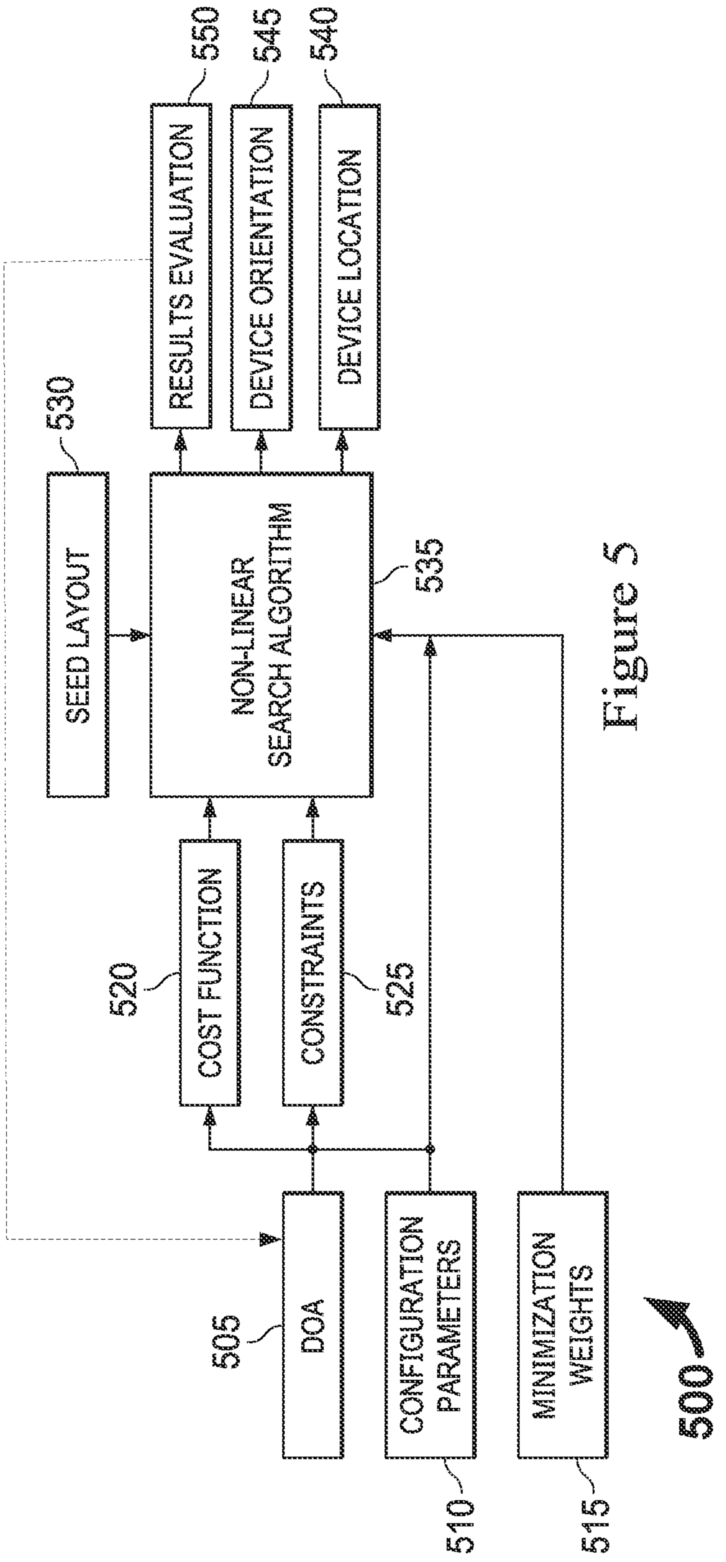
FIG. 5 is a flow diagram that outlines another example of a method for automatically estimating device locations and orientations based on DOA data.

FIG. 5 is a flow diagram that outlines another example of a method for automatically estimating device locations and orientations based on DOA data. Method 500 may, for example, be performed by implementing a localization algorithm via a control system of an apparatus such as that shown in FIG. 10. The blocks of method 500, like other methods described herein, are not necessarily performed in the order indicated. Moreover, such methods may include more or fewer blocks than shown and/or described.

According to this example, DOA data are obtained in block 505. According to some implementations, block 505 may involve obtaining acoustic DOA data, e.g., as described above with reference to blocks 405-420 of FIG. 4. Alternatively, or additionally, block 505 may involve obtaining DOA data corresponding to electromagnetic waves that are transmitted by, and received by, each of a plurality of devices in an environment.

In this example, the localization algorithm receives as input the DOA data obtained in block 505 from every smart device to every other smart device in an audio environment, along with any configuration parameters 510 specified for the audio environment. In some examples, optional constraints 525 may be applied to the DOA data. The configuration parameters 510, minimization weights 515, the optional constraints 525 and the seed layout 530 may, for example, be obtained from a memory by a control system that is executing software for implementing the cost function 520 and the non-linear search algorithm 535. The configuration parameters 510 may, for example, include data corresponding to maximum room dimensions, loudspeaker layout constraints, external input to set a global translation (e.g., 2 parameters), a global rotation (1 parameter), and a global scale (1 parameter), etc.

According to this example, the configuration parameters 510 are provided to the cost function 520 and to the non-linear search algorithm 535. In some examples, the configuration parameters 510 are provided to optional constraints 525. In this example, the cost function 520 takes into account the differences between the measured DOAs and the DOAs estimated by an optimizer's localization solution.

In some embodiments, the optional constraints 525 impose restrictions on the possible audio device location and/or orientation, such as imposing a condition that audio devices are a minimum distance from each other. Alternatively, or additionally, the optional constraints 525 may impose restrictions on dummy minimization variables introduced by convenience, e.g., as described below.

In this example, minimization weights 515 are also provided to the non-linear search algorithm 535. Some examples are described below.

According to some implementations, the non-linear search algorithm 535 is an algorithm that can find local solutions to a continuous optimization problem of the form:

$$\min C(x)$$

$$x \in C^n$$

$$\text{such that } g_L \leq g(x) \leq g_U$$

$$\text{and } x_L \leq x \leq x_U$$

In the foregoing expressions, $C(x): R^n \rightarrow R$ represent the cost function 520, and $g(x): R^n \rightarrow R^m$ represent constraint functions corresponding to the optional constraints 525. In these examples, the vectors $g_L$ and $g_U$ represent the lower and upper bounds on the constraints, and the vectors $x_L$ and $x_U$ represent the bounds on the variables x.

The non-linear search algorithm 535 may vary according to the particular implementation. Examples of the non-linear search algorithm 535 include gradient descent methods, the Broyden-Fletcher-Goldfarb-Shanno (BFGS) method, interior point optimization (IPOPT) methods, etc. While some of the non-linear search algorithms require only the values of the cost functions and the constraints, some other methods also may require the first derivatives (gradients, Jacobians) of the cost function and constraints, and some other methods also may require the second derivatives (Hessians) of the same functions. If the derivatives are required, they can be provided explicitly, or they can be computed automatically using automatic or numerical differentiation techniques.

Some non-linear search algorithms need seed point information to start the minimization, as suggested by the seed layout 530 that is provided to the non-linear search algorithm 535 in FIG. 5. In some examples, the seed point information may be provided as a layout consisting of the same number of smart audio devices (in other words, the same number as the actual number of smart audio devices for which DOA data are obtained) with corresponding locations and orientations. The locations and orientations may be arbitrary, and need not be the actual or approximate locations and orientations of the smart audio devices. In some examples, the seed point information may indicate smart audio device locations that are along an axis or another arbitrary line of the audio environment, smart audio device locations that are along a circle, a rectangle or other geometric shape within the audio environment, etc. In some examples, the seed point information may indicate arbitrary smart audio device orientations, which may be predetermined smart audio device orientations or random smart audio device orientations.

In some embodiments, the cost function 520 can be formulated in terms of complex plane variables as follows:

$$C_{DOA}(x, z) = \sum_{n=1}^{N} \sum_{\substack{m=1 \\ m \neq n}}^{N} w_{nm}^{DOA} \left| Z_{nm} - z_n^* \left( \frac{x_m - x_n}{|x_m - x_n|} \right) \right|^2,$$

wherein the star indicates complex conjugation, the bar indicates absolute value, and where:

- $Z_{nm} = \exp(i\ DOA_{nm})$ represents the complex plane value giving the direction of arrival of smart device in as measured from device n, with i representing the imaginary unit;
- $x_n = x_{nx} + ix_{ny}$ represents the complex plane value encoding the x and y positions of the smart device n;
- $z_n = \exp(i\alpha_n)$ represents the complex value encoding the angle $\alpha_n$ of orientation of the smart device n;
- $w_{nm}^{DOA}$ represents the weight given to the $DOA_{nm}$ measurement;
- N represents the number of smart audio devices for which DOA data are obtained; and
- $x = (x_1, \ldots, x_N)$ and $z = (z_1, \ldots, z_N)$ represent vectors of the complex positions and complex orientations, respectively, of all N smart audio devices.

According to this example, the outcomes of the minimization are device location data 540 indicating the 2D position of the smart devices, $x_k$ (representing 2 real unknowns per device) and device orientation data 545 indicating the orientation vector of the smart devices $z_k$ (representing 2 additional real variables per device). From the orientation vector, only the angle of orientation of the smart device $\alpha_k$ is relevant for the problem (1 real unknown per device). Therefore, in this example there are 3 relevant unknowns per smart device.

In some examples, results evaluation block 550 involves computing the residual of the cost function at the outcome position and orientations. A relatively lower residual indicates relatively more precise device localization values. According to some implementations, the results evaluation block 550 may involve a feedback process. For example, some such examples may implement a feedback process that involves comparing the residual of a given DOA candidate combination with another DOA candidate combination, e.g., as explained in the DOA robustness measures discussion below.

As noted above, in some implementations block 505 may involve obtaining acoustic DOA data as described above with reference to blocks 405-420 of FIG. 4, which involve determining DOA candidates and selecting DOA candidates. Accordingly, FIG. 5 includes a dashed line from the results evaluation block 550 to block 505, to represent one flow of an optional feedback process. Moreover, FIG. 4 includes a dashed line from block 430 (which may involve results evaluation in some examples) to DOA candidate selection block 420, to represent a flow of another optional feedback process.

In some embodiments, the non-linear search algorithm 535 may not accept complex-valued variables. In such cases, every complex-valued variable can be replaced by a pair of real variables.

In some implementations, there may be additional prior information regarding the availability or reliability of each DOA measurement. In some such examples, loudspeakers may be localized using only a subset of all the possible DOA elements. The missing DOA elements may, for example, be masked with a corresponding zero weight in the cost function. In some such examples, the weights $w_{nm}$ may be either be zero or one, e.g., zero for those measurements which are either missing or considered not sufficiently reliable and one for the reliable measurements. In some other embodiments, the weights $w_{nm}$ may have a continuous value from zero to one, as a function of the reliability of the DOA measurement. In those embodiments in which no prior information is available, the weights $w_{nm}$ may simply be set to one.

In some implementations, the conditions $|z_k|=1$ (one condition for every smart audio device) may be added as constraints to ensure the normalization of the vector indicating the orientation of the smart audio device. In other examples, these additional constraints may not be needed, and the vector indicating the orientation of the smart audio device may be left unnormalized. Other implementations may add as constraints conditions on the proximity of the smart audio devices, e.g., indicating that $|x_n-x_m|\geq D$, where D is the minimum distance between smart audio devices.

The minimization of the cost function above does not fully determine the absolute position and orientation of the smart audio devices. According to this example, the cost function remains invariant under a global rotation (1 independent parameter), a global translation (2 independent parameters), and a global rescaling (1 independent parameter), affecting simultaneously all the smart devices locations and orientations. This global rotation, translation, and rescaling cannot be determined from the minimization of the cost function. Different layouts related by the symmetry transformations are totally indistinguishable in this framework and are said to belong to the same equivalence class. Therefore, the configuration parameters should provide criteria to allow uniquely defining a smart audio device layout representing an entire equivalence class. In some embodiments, it may be advantageous to select criteria so that this smart audio device layout defines a reference frame that is close to the reference frame of a listener near a reference listening position. Examples of such criteria are provided below. In some other examples, the criteria may be purely mathematical and disconnected from a realistic reference frame.

The symmetry disambiguation criteria may include a reference position, fixing the global translation symmetry (e.g., smart audio device 1 should be at the origin of coordinates); a reference orientation, fixing the two-dimensional rotation symmetry (e.g., smart device 1 should be oriented toward an area of the audio environment designated as the front, such as where the television 101 is located in FIGS. 1-3); and a reference distance, fixing the global scaling symmetry (e.g., smart device 2 should be at a unit distance from smart device 1). In total, there are 4 parameters that cannot be determined from the minimization problem in this example and that should be provided as an external input. Therefore, in this example there are 3N-4 unknowns that can be determined from the minimization problem.

As described above, in some examples, in addition to the set of smart audio devices, there may be one or more passive audio receivers, equipped with a microphone array, and/or one or more audio emitters. In such cases the localization process may use a technique to determine the smart audio device location and orientation, emitter location, and passive receiver location and orientation, from the audio emitted by every smart audio device and every emitter and captured by every other smart audio device and every passive receiver, based on DOA estimation.

In some such examples, the localization process may proceed in a similar manner as described above. In some instances, the localization process may be based on the same cost function described above, which is shown below for the reader's convenience:

$$C_{DOA}(x,z)=\sum_{n=1}^{N}\sum_{\substack{m=1\\m\neq n}}^{N} w_{nm}^{DOA}\left|Z_{nm}-z_n^*\left(\frac{x_m-x_n}{|x_m-x_n|}\right)\right|^2$$

However, if the localization process involves passive audio receivers and/or audio emitters that are not audio receivers, the variables of the foregoing equation need to be interpreted in a slightly different way. Now N represents the total number of devices, including $N_{smart}$ smart audio devices, $N_{rec}$ passive audio receivers and $N_{emit}$ emitters, so that $N=N_{smart}+N_{rec}+N_{emit}$. In some examples, the weights $w_{nm}^{DOA}$ may have a sparse structure to mask out missing data due to passive receivers or emitter-only devices (or other audio sources without receivers, such as human beings), so that $w_{nm}^{DOA}=0$ for all m if device n is an audio emitter without a receiver, and $w_{nm}^{DOA}=0$ for all n if device m is an audio receiver. For both smart audio devices and passive receivers both the position and angle can be determined, whereas for audio emitters only the position can be obtained. The total number of unknowns is $3N_{smart}+3N_{rec}+2N_{emit}-4$.

Combined Time of Arrival and Direction of Arrival Localization

In the following discussion, the differences between the above-described DOA-based localization processes and the combined DOA and TOA localization of this section will be emphasized. Those details that are not explicitly given may be assumed to be the same as those in the above-described DOA-based localization processes.

Figure 6:
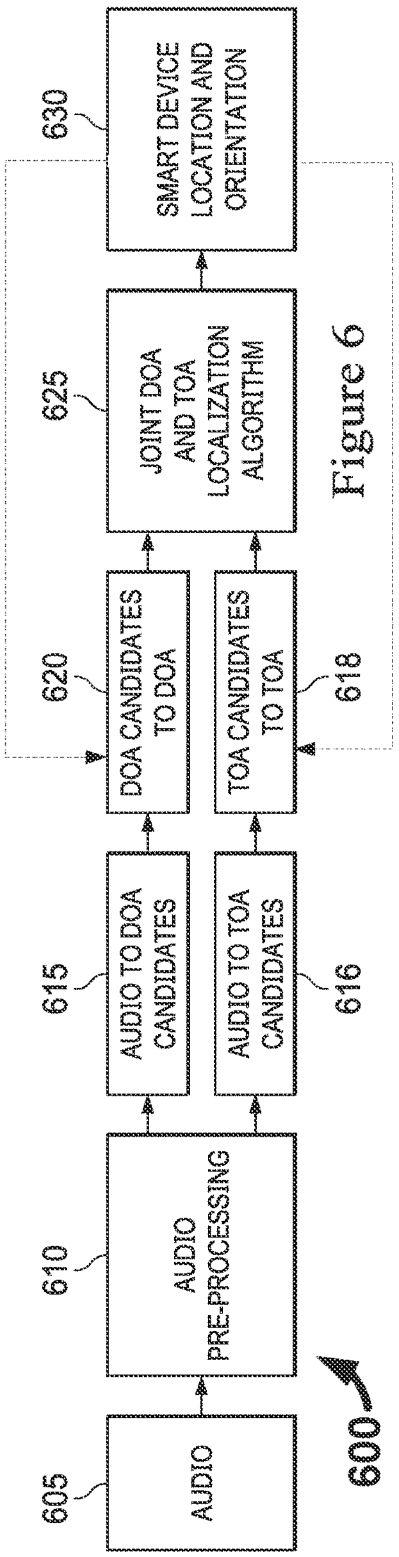
FIG. 6 is a flow diagram that outlines one example of a method for automatically estimating device locations and orientations based on DOA data and TOA data.

FIG. 6 is a flow diagram that outlines one example of a method for automatically estimating device locations and orientations based on DOA data and TOA data. Method 600 may, for example, be performed by implementing a localization algorithm via a control system of an apparatus such as that shown in FIG. 10. The blocks of method 600, like other methods described herein, are not necessarily performed in the order indicated. Moreover, such methods may include more or fewer blocks than shown and/or described.

According to this example, DOA data are obtained in blocks 605-620. According to some implementations, blocks 605-620 may involve obtaining acoustic DOA data from a plurality of smart audio devices, e.g., as described above with reference to blocks 405-420 of FIG. 4. In some alternative implementations, blocks 605-620 may involve obtaining DOA data corresponding to electromagnetic waves that are transmitted by, and received by, each of a plurality of devices in an environment.

In this example, however, block 605 also involves obtaining TOA data. According to this example, the TOA data includes the measured TOA of audio emitted by, and received by, every smart audio device in the audio environment (e.g., every pair of smart audio devices in the audio environment). In some embodiments that involve emitting structured source signals, the audio used to extract the TOA data may be the same as was used to extract the DOA data. In other embodiments, the audio used to extract the TOA data may be different from that used to extract the DOA data.

According to this example, block 616 involves detecting TOA candidates in the audio data and block 618 involves selecting a single TOA for each smart audio device pair from among the TOA candidates. Some examples are described below.

Various techniques may be used to obtain the TOA data. One method is to use a room calibration audio sequence, such as a sweep (e.g., a logarithmic sine tone) or a Maximum Length Sequence (MLS). Optionally, either aforementioned sequence may be used with band-limiting to the close ultrasonic audio frequency range (e.g., 18 kHz to 24 kHz). In this audio frequency range most standard audio equipment is able to emit and record sound, but such a signal cannot be perceived by humans because it lies beyond the normal human hearing capabilities. Some alternative implementations may involve recovering TOA elements from a hidden signal in a primary audio signal, such as a Direct Sequence Spread Spectrum signal.

Given a set of DOA data from every smart audio device to every other smart audio device, and the set of TOA data from every pair of smart audio devices, the localization method 625 of FIG. 6 may be based on minimizing a certain cost function, possibly subject to some constraints. In this example, the localization method 625 of FIG. 6 receives as input data the above-described DOA and TOA values, and outputs the estimated location data and orientation data 630 corresponding to the smart audio devices. In some examples, the localization method 625 also may output the playback and recording latencies of the smart audio devices, e.g., up to some global symmetries that cannot be determined from the minimization problem. Some examples are described below.

Figure 7:
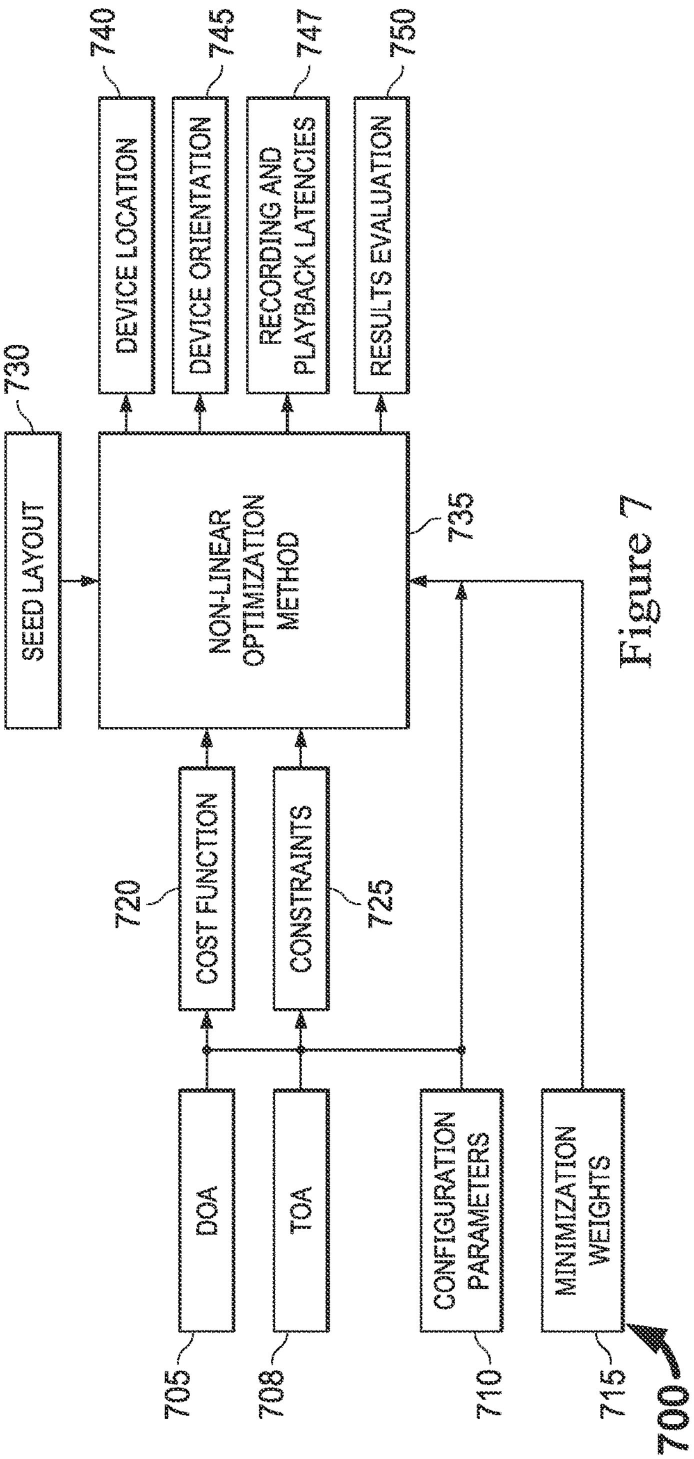
FIG. 7 is a flow diagram that outlines another example of a method for automatically estimating device locations and orientations based on DOA data and TOA data.

FIG. 7 is a flow diagram that outlines another example of a method for automatically estimating device locations and orientations based on DOA data and TOA data. Method 700 may, for example, be performed by implementing a localization algorithm via a control system of an apparatus such as that shown in FIG. 10. The blocks of method 700, like other methods described herein, are not necessarily performed in the order indicated. Moreover, such methods may include more or fewer blocks than shown and/or described.

Except as described below, in some examples blocks 705, 710, 715, 720, 725, 730, 735, 740, 745 and 750 may be as described above with reference to blocks 505, 510, 515, 520, 525, 530, 535, 540, 545 and 550 of FIG. 5. However, in this example the cost function 720 and the non-linear optimization method 735 are modified, with respect to the cost function 520 and the non-linear optimization method 535 of FIG. 5, so as to operate on both DOA data and TOA data. The TOA data of block 708 may, in some examples, be obtained as described above with reference to FIG. 6. Another difference, as compared to the process of FIG. 5, is that in this example the non-linear optimization method 735 also outputs recording and playback latency data 747 corresponding to the smart audio devices, e.g., as described below. Accordingly, in some implementations, the results evaluation block 750 may involve evaluating both DOA data and/or TOA data. In some such examples, the operations of block 750 may include a feedback process involving the DOA data and/or TOA data. For example, some such examples may implement a feedback process that involves comparing the residual of a given TOA/DOA candidate combination with another TOA/DOA candidate combination, e.g., as explained in the TOA/DOA robustness measures discussion below.

In some examples, results evaluation block 750 involves computing the residual of the cost function at the outcome position and orientations. A relatively lower residual normally indicates relatively more precise device localization values. According to some implementations, the results evaluation block 750 may involve a feedback process. For example, some such examples may implement a feedback process that involves comparing the residual of a given TOA/DOA candidate combination with another TOA/DOA candidate combination, e.g., as explained in the TOA and DOA robustness measures discussion below.

Accordingly, FIG. 6 includes dashed lines from block 630 (which may involve results evaluation in some examples) to DOA candidate selection block 620 and TOA candidate selection block 618, to represent a flow of an optional feedback process. In some implementations block 705 may involve obtaining acoustic DOA data as described above with reference to blocks 605-620 of FIG. 6, which involve determining DOA candidates and selecting DOA candidates. In some examples block 708 may involve obtaining acoustic TOA data as described above with reference to blocks 605-618 of FIG. 6, which involve determining TOA candidates and selecting TOA candidates. Although not shown in FIG. 7, some optional feedback processes may involve reverting from the results evaluation block 750 to block 705 and/or block 708.

According to this example, the localization algorithm proceeds by minimizing a cost function, possibly subject to some constraints, and can be described as follows. In this example, the localization algorithm receives as input the DOA data 705 and the TOA data 708, along with configuration parameters 710 specified for the listening environment and possibly some optional constraints 725. In this example, the cost function takes into account the differences between the measured DOA and the estimated DOA, and the differences between the measured TOA and the estimated TOA. In some embodiments, the constraints 725 impose restrictions on the possible device location, orientation, and/or latencies, such as imposing a condition that audio devices are a minimum distance from each other and/or imposing a condition that some device latencies should be zero.

In some implementations, the cost function can be formulated as follows:

$$C(x,z,\ell,k)=W_{DOA}C_{DOA}(x,z)+W_{TOA}C_{TOA}(x,\ell,k)$$

In the foregoing equation, $\ell=(\ell_1, \ldots, \ell_N)$ and $k=(k_1, \ldots, k_N)$ are represent vectors of playback and recording devices for every device, respectively, and where $W_{DOA}$ and $W_{TOA}$ represent the global weights (also known as prefactors) of the DOA and TOA minimization parts, respectively, reflecting the relative importance of each one of the two terms. In some such examples, the TOA cost function can be formulated as:

$$C_{TOA}(x, \ell, k) = \sum_{n=1}^{N}\sum_{m=1}^{N} w_{nm}^{TOA}(cTOA_{nm} - c\ell_m + ck_n - |x_m - x_n|),^2$$

where $TOA_{nm}$ represents the measured time of arrival of signal travelling from smart device m to smart device n;

$w_{nm}^{TOA}$ represents the weight given to the TOA nm measurement; and c represents the speed of sound.

There are up to 5 real unknowns per every smart audio device: the device positions $x_n$ (2 real unknowns per device), the device orientations $a_n$ (1 real unknown per device) and the recording and playback latencies $\ell_n$ and $k_n$ (2 additional unknowns per device). From these, only device positions and latencies are relevant for the TOA part of the cost function. The number of effective unknowns can be reduced in some implementations if there are a priori known restrictions or links between the latencies.

In some examples, there may be additional prior information, e.g., regarding the availability or reliability of each TOA measurement. In some of these examples, the weights $w_{nm}^{TOA}$ can either be zero or one, e.g., zero for those measurements which are not available (or considered not sufficiently reliable) and one for the reliable measurements. This way, device localization may be estimated with only a subset of all possible DOA and/or TOA elements. In some other implementations, the weights may have a continuous value from zero to one, e.g., as a function of the reliability of the TOA measurement. In some examples, in which no prior reliability information is available, the weights may simply be set to one.

According to some implementations, one or more additional constraints may be placed on the possible values of the latencies and/or the relation of the different latencies among themselves.

In some examples, the position of the audio devices may be measured in standard units of length, such as meters, and the latencies and times of arrival may be indicated in standard units of time, such as seconds. However, it is often the case that non-linear optimization methods work better when the scale of variation of the different variables used in the minimization process is of the same order. Therefore, some implementations may involve rescaling the position measurements so that the range of variation of the smart device positions ranges between −1 and 1, and rescaling the latencies and times of arrival so that these values range between −1 and 1 as well.

The minimization of the cost function above does not fully determine the absolute position and orientation of the smart audio devices or the latencies. The TOA information gives an absolute distance scale, meaning that the cost function is no longer invariant under a scale transformation, but still remains invariant under a global rotation and a global translation. Additionally, the latencies are subject to an additional global symmetry: the cost function remains invariant if the same global quantity is added simultaneously to all the playback and recording latencies. These global transformations cannot be determined from the minimization of the cost function. Similarly, the configuration parameters should provide a criterion to allowing to uniquely define a device layout representing an entire equivalence class.

In some examples, the symmetry disambiguation criteria may include the following: a reference position, fixing the global translation symmetry (e.g., smart device 1 should be at the origin of coordinates); a reference orientation, fixing the two-dimensional rotation symmetry (e.g., smart device 1 should be oriented toward the front); and a reference latency (e.g., recording latency for device 1 should be zero). In total, in this example there are 4 parameters that cannot be determined from the minimization problem and that should be provided as an external input. Therefore, there are 5N-4 unknowns that can be determined from the minimization problem.

In some implementations, besides the set of smart audio devices, there may be one or more passive audio receivers, which may not be equipped with a functioning microphone array, and/or one or more audio emitters. The inclusion of latencies as minimization variables allows some disclosed methods to localize receivers and emitters for which emission and reception times are not precisely known. In some such implementations, the TOA cost function described above may be implemented. This cost function is shown again below for the reader's convenience:

$$C_{TOA}(x, \ell, k) = \sum_{n=1}^{N}\sum_{m=1}^{N} w_{nm}^{TOA}(cTOA_{nm} - c\ell_m + ck_n - |x_m - x_n|)^2$$

As described above with reference to the DOA cost function, the cost function variables need to be interpreted in a slightly different way if the cost function is used for localization estimates involving passive receivers and/or emitters. Now N represents the total number of devices, including $N_{smart}$ smart audio devices, $N_{rec}$ passive audio receivers and $N_{emit}$ emitters, so that $N=N_{smart}+N_{rec}+N_{emit}$. The weights $w_{nm}^{DOA}$ may have a sparse structure to mask out missing data due to passive receivers or emitters-only, e.g., so that $w_{nm}^{DOA}=0$ for all m if device n is an audio emitter, and $w_{nm}^{DOA}=0$ for all n if device m is an audio receiver. According to some implementations, for smart audio devices positions, orientations, and recording and playback latencies must be determined; for passive receivers, positions, orientations, and recording latencies must be determined; and for audio emitters, positions and playback latencies must be determined. According to some such examples, the total number of unknowns is therefore $5N_{smart}+4N_{rec}+3N_{emit}-4$.

Disambiguation of Global Translation and Rotation

Solutions to both DOA-only and combined TOA and DOA problems are subject to a global translation and rotation ambiguity. In some examples, the translation ambiguity can be resolved by treating an emitter-only source as a listener and translating all devices such that the listener lies at the origin.

Rotation ambiguities can be resolved by placing additional constraints on the solution. For example, some multi-loudspeaker environments may include television (TV) loudspeakers and a couch positioned for TV viewing. After locating the loudspeakers in the environment, some methods may involve finding a vector joining the listener to the TV viewing direction. Some such methods may then involve having the TV emit a sound from its loudspeakers and/or prompting the user to walk up to the TV and locating the user's speech. Some implementations may involve rendering an audio object that pans around the environment. A user may provide user input (e.g., saying "Stop") indicating when the audio object is in one or more predetermined positions within the environment, such as the front of the environment, at a TV location of the environment, etc. Some implementations involve a cellphone app equipped with an inertial measurement unit that prompts the user to point the cellphone in two defined directions: the first in the direction of a particular device, for example the device with lit LEDs, the second in the user's desired viewing direction, such as the front of the environment, at a TV location of the environment, etc. Some detailed disambiguation examples will now be described with reference to FIGS. 8A-8D.

Figure 8A:
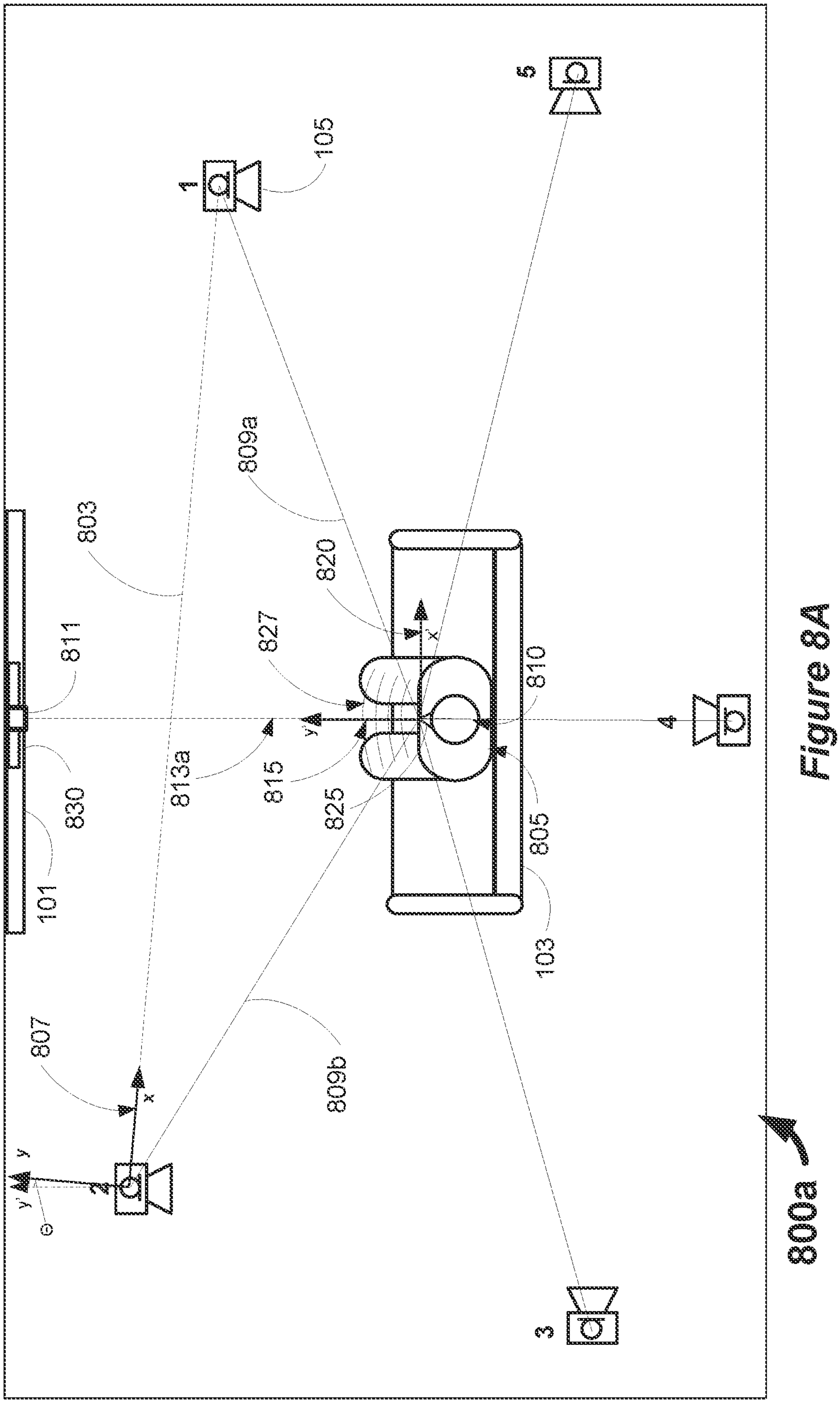
FIG. 8A shows an example of an audio environment.

FIG. 8A shows an example of an audio environment. According to some examples, the audio device location data output by one of the disclosed localization methods may include an estimate of an audio device location for each of audio devices 1-5, with reference to the audio device coordinate system 807. In this implementation, the audio device coordinate system 807 is a Cartesian coordinate system having the location of the microphone of audio device 2 as its origin. Here, the x axis of the audio device coordinate system 807 corresponds with a line 803 between the location of the microphone of audio device 2 and the location of the microphone of audio device 1.

In this example, this example, the listener location is determined by prompting the listener 805 who is shown seated on the couch 103 (e.g., via an audio prompt from one or more loudspeakers in the environment 800*a*) to make one or more utterances 827 and estimating the listener location according to time-of-arrival (TOA) data. The TOA data corresponds to microphone data obtained by a plurality of microphones in the environment. In this example, the microphone data corresponds with detections of the one or more utterances 827 by the microphones of at least some (e.g., 3, 4 or all 5) of the audio devices 1-5.

Alternatively, or additionally, the listener location may be estimated according to DOA data provided by the microphones of at least some (e.g., 2, 3, 4 or all 5) of the audio devices 1-5. According to some such examples, the listener location may be determined according to the intersection of lines 809*a*, 809*b*, etc., corresponding to the DOA data.

According to this example, the listener location corresponds with the origin of the listener coordinate system 820. In this example, the listener angular orientation data is indicated by the y' axis of the listener coordinate system 820, which corresponds with a line 813*a* between the listener's head 810 (and/or the listener's nose 825) and the sound bar 830 of the television 101. In the example shown in FIG. 8A, the line 813*a* is parallel to the y' axis. Therefore, the angle Θ represents the angle between the y axis and the y' axis. In this example, block 1225 of FIG. 12 may involve a rotation by the angle Θ of audio device coordinates around the origin of the listener coordinate system 820. Accordingly, although the origin of the audio device coordinate system 807 is shown to correspond with audio device 2 in FIG. 8A, some implementations involve co-locating the origin of the audio device coordinate system 807 with the origin of the listener coordinate system 820 prior to the rotation by the angle Θ of audio device coordinates around the origin of the listener coordinate system 820. This co-location may be performed by a coordinate transformation from the audio device coordinate system 807 to the listener coordinate system 820.

The location of the sound bar 830 and/or the television 101 may, in some examples, be determined by causing the sound bar to emit a sound and estimating the sound bar's location according to DOA and/or TOA data, which may correspond detections of the sound by the microphones of at least some (e.g., 3, 4 or all 5) of the audio devices 1-5. Alternatively, or additionally, the location of the sound bar 830 and/or the television 101 may be determined by prompting the user to walk up to the TV and locating the user's speech by DOA and/or TOA data, which may correspond detections of the sound by the microphones of at least some (e.g., 3, 4 or all 5) of the audio devices 1-5. Some such methods may involve applying a cost function, e.g., as described above. Some such methods may involve triangulation. Such examples may be beneficial in situations wherein the sound bar 830 and/or the television 101 has no associated microphone.

In some other examples wherein the sound bar 830 and/or the television 101 does have an associated microphone, the location of the sound bar 830 and/or the television 101 may be determined according to TOA and/or DOA methods, such as the methods disclosed herein. According to some such methods, the microphone may be co-located with the sound bar 830.

According to some implementations, the sound bar 830 and/or the television 101 may have an associated camera 811. A control system may be configured to capture an image of the listener's head 810 (and/or the listener's nose 825). In some such examples, the control system may be configured to determine a line 813*a* between the listener's head 810 (and/or the listener's nose 825) and the camera 811. The listener angular orientation data may correspond with the line 813*a*. Alternatively, or additionally, the control system may be configured to determine an angle Θ between the line 813*a* and the y axis of the audio device coordinate system.

Figure 8B:
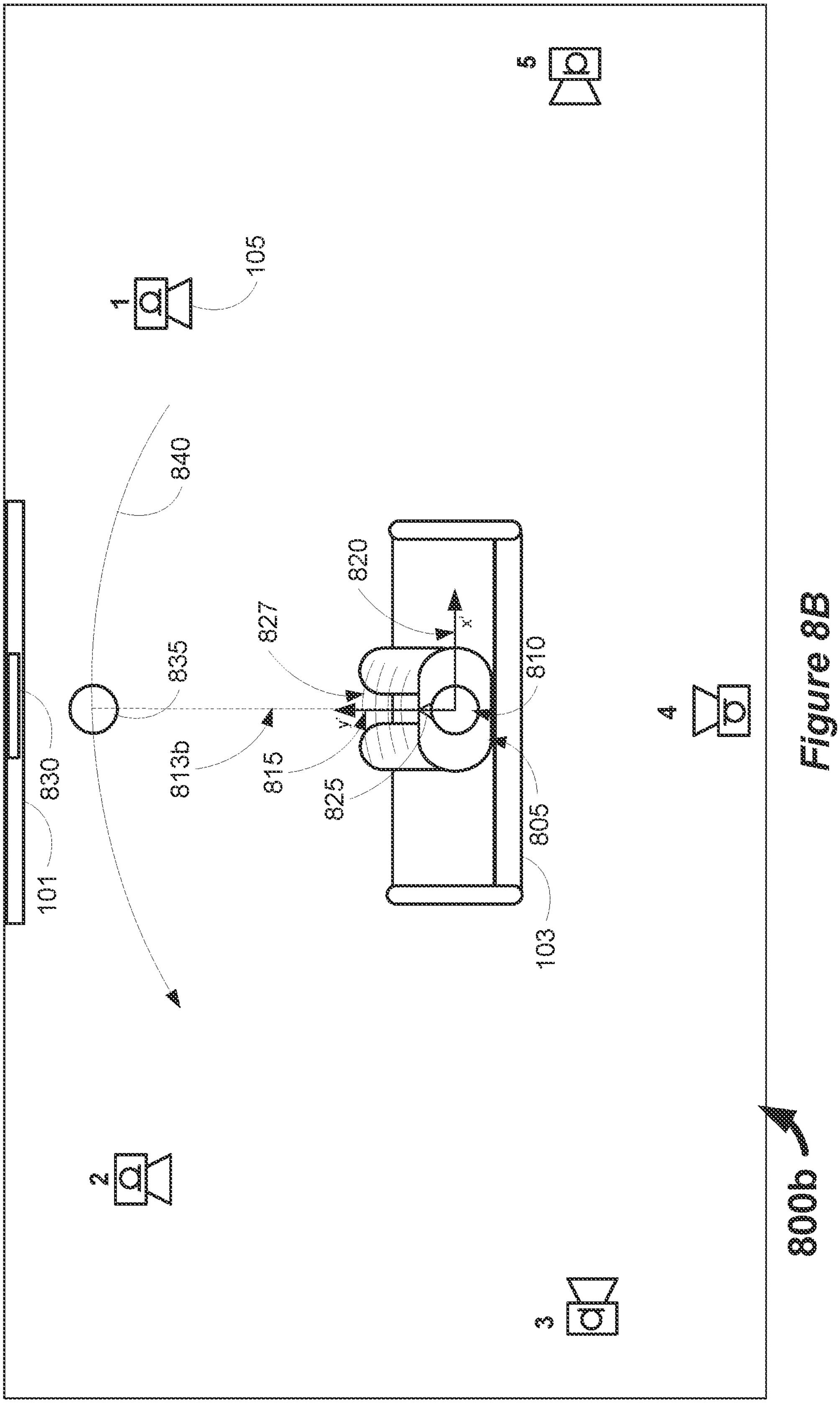
FIG. 8B shows an additional example of determining listener angular orientation data.

FIG. 8B shows an additional example of determining listener angular orientation data. According to this example, the listener location has already been determined in block 1215 of FIG. 12. Here, a control system is controlling loudspeakers of the environment 800*b* to render the audio object 835 to a variety of locations within the environment 800*b*. In some such examples, the control system may cause the loudspeakers to render the audio object 835 such that the audio object 835 seems to rotate around the listener 805, e.g., by rendering the audio object 835 such that the audio object 835 seems to rotate around the origin of the listener coordinate system 820. In this example, the curved arrow 840 shows a portion of the trajectory of the audio object 835 as it rotates around the listener 805.

According to some such examples, the listener 805 may provide user input (e.g., saying "Stop") indicating when the audio object 835 is in the direction that the listener 805 is facing. In some such examples, the control system may be configured to determine a line 813*b* between the listener location and the location of the audio object 835. In this example, the line 813*b* corresponds with the y' axis of the listener coordinate system, which indicates the direction that the listener 805 is facing. In alternative implementations, the listener 805 may provide user input indicating when the audio object 835 is in the front of the environment, at a TV location of the environment, at an audio device location, etc.

Figure 8C:
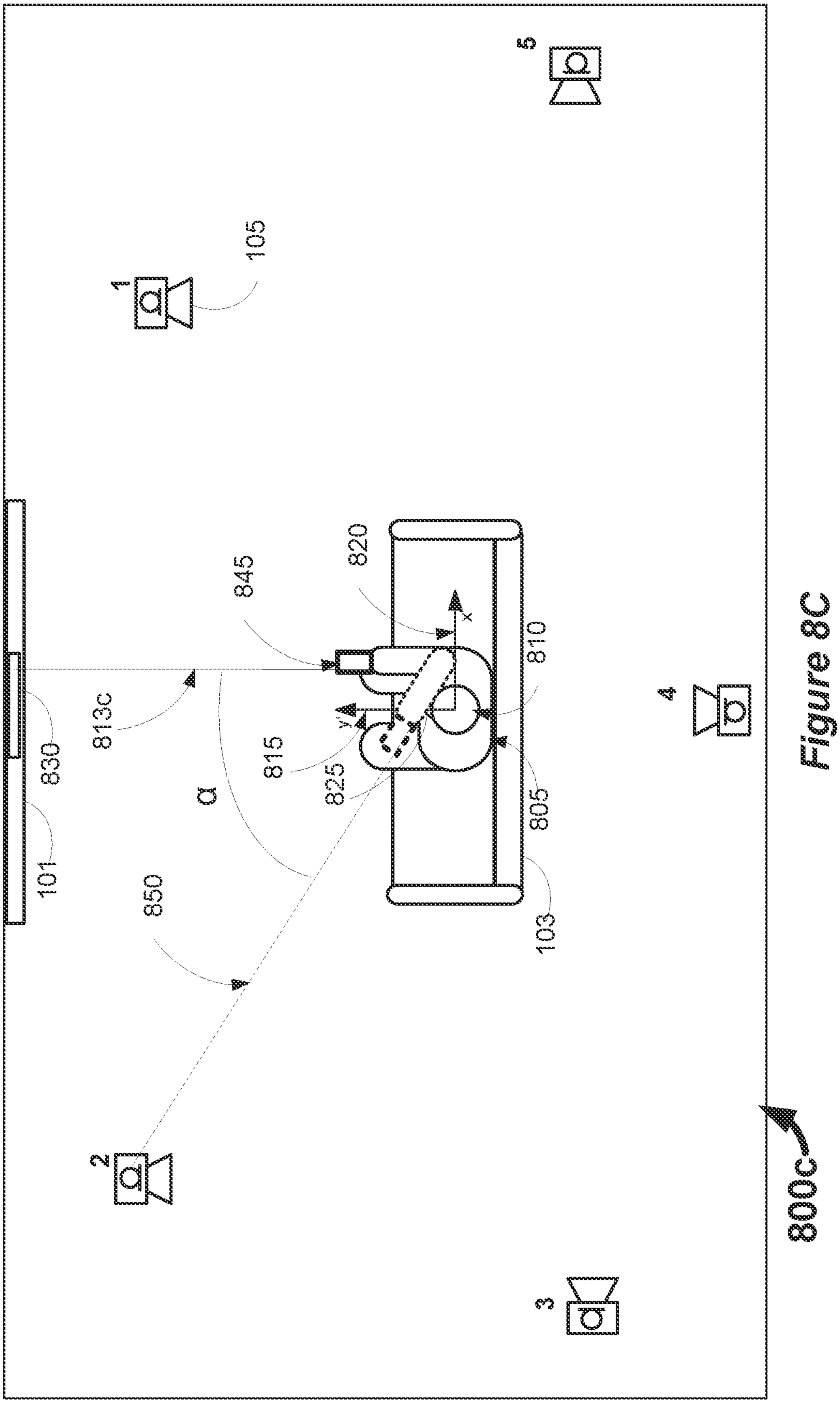
FIG. 8C shows an additional example of determining listener angular orientation data.

FIG. 8C shows an additional example of determining listener angular orientation data. According to this example, the listener location has already been determined in block 1215 of FIG. 12. Here, the listener 805 is using a handheld device 845 to provide input regarding a viewing direction of the listener 805, by pointing the handheld device 845 towards the television 101 or the soundbar 830. The dashed outline of the handheld device 845 and the listener's arm indicate that at a time prior to the time at which the listener 805 was pointing the handheld device 845 towards the television 101 or the soundbar 830, the listener 805 was pointing the handheld device 845 towards audio device 2 in this example. In other examples, the listener 805 may have pointed the handheld device 845 towards another audio device, such as audio device 1. According to this example, the handheld device 845 is configured to determine an angle α between audio device 2 and the television 101 or the soundbar 830, which approximates the angle between audio device 2 and the viewing direction of the listener 805.

The handheld device 845 may, in some examples, be a cellular telephone that includes an inertial sensor system and a wireless interface configured for communicating with a control system that is controlling the audio devices of the environment 800*c*. In some examples, the handheld device 845 may be running an application or "app" that is configured to control the handheld device 845 to perform the necessary functionality, e.g., by providing user prompts (e.g., via a graphical user interface), by receiving input indicating that the handheld device 845 is pointing in a desired direction, by saving the corresponding inertial sensor data and/or transmitting the corresponding inertial sensor data to the control system that is controlling the audio devices of the environment 800*c*, etc.

According to this example, a control system (which may be a control system of the handheld device 845, a control system of a smart audio device of the environment 800*c* or a control system that is controlling the audio devices of the environment 800*c*) is configured to determine the orientation of lines 813*c* and 850 according to the inertial sensor data, e.g., according to gyroscope data. In this example, the line 813*c* is parallel to the axis y' and may be used to determine the listener angular orientation. According to some examples, a control system may determine an appropriate rotation for the audio device coordinates around the origin of the listener coordinate system 820 according to the angle α between audio device 2 and the viewing direction of the listener 805.

Figure 8D:
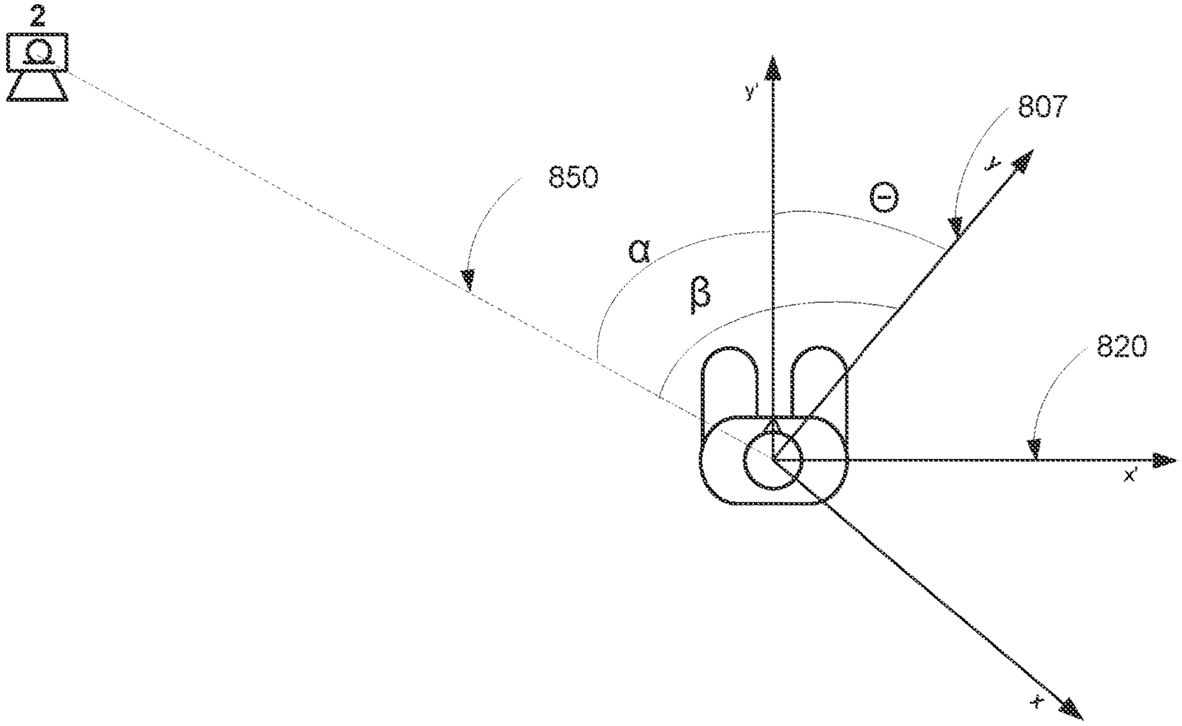
FIG. 8D shows one example of determine an appropriate rotation for the audio device coordinates in accordance with the method described with reference to FIG. 8C.

FIG. 8D shows one example of determine an appropriate rotation for the audio device coordinates in accordance with the method described with reference to FIG. 8C. In this example, the origin of the audio device coordinate system 807 is co-located with the origin of the listener coordinate system 820. Co-locating the origins of the audio device coordinate system 807 and the listener coordinate system 820 is made possible after the listener location is determined. Co-locating the origins of the audio device coordinate system 807 and the listener coordinate system 820 may involve transforming the audio device locations from the audio device coordinate system 807 to the listener coordinate system 820. The angle α has been determined as described above with reference to FIG. 8C. Accordingly, the angle α corresponds with the desired orientation of the audio device 2 in the listener coordinate system 820. In this example, the angle β corresponds with the orientation of the audio device 2 in the audio device coordinate system 807. The angle Θ, which is β-α in this example, indicates the necessary rotation to align the y axis of the of the audio device coordinate system 807 with the y' axis of the listener coordinate system 820.

DOA Robustness Measures

As noted above with reference to FIG. 4, in some examples using "blind" methods that are applied to arbitrary signals including steered response power, beamforming, or other similar methods, robustness measures may be added to improve accuracy and stability. Some implementations include time integration of beamformer steered response to filter out transients and detect only the persistent peaks, as well as to average out random errors and fluctuations in those persistent DOAs. Other examples may use only limited frequency bands as input, which can be tuned to room or signal types for better performance.

For examples using 'supervised' methods that involve the use of structured source signals and deconvolution methods to yield impulse responses, preprocessing measures can be implemented to enhance the accuracy and prominence of DOA peaks. In some examples, such preprocessing may include truncation with an amplitude window of some temporal width starting at the onset of the impulse response on each microphone channel. Such examples may incorporate an impulse response onset detector such that each channel onset can be found independently.

In some examples based on either 'blind' or 'supervised' methods as described above, still further processing may be added to improve DOA accuracy. It is important to note that DOA selection based on peak detection (e.g., during Steered-Response Power (SRP) or impulse response analysis) is sensitive to environmental acoustics that can give rise to the capture of non-primary path signals due to reflections and device occlusions that will dampen both receive and transmit energy. These occurrences can degrade the accuracy of device pair DOAs and introduce errors in the optimizer's localization solution. It is therefore prudent to regard all peaks within predetermined thresholds as candidates for ground truth DOAs. One example of a predetermined threshold is a requirement that a peak be larger than the mean Steered-Response Power (SRP). For all detected peaks, prominence thresholding and removing candidates below the mean signal level have proven to be simple yet effective initial filtering techniques. As used herein, "prominence" is a measure of how large a local peak is compared to its adjacent local minima, which is different from thresholding only based on power. One example of a prominence threshold is a requirement that the difference in power between a peak and its adjacent local minima be at or above a threshold value. Retention of viable candidates improves the chances that a device pair will contain a usable DOA in their set (within an acceptable error tolerance from the ground truth), though there is the chance that it will not contain a usable DOA in cases where the signal is corrupted by strong reflections/occlusions. In some examples, a selection algorithm may be implemented in order to do one of the following: 1) select the best usable DOA candidate per device pair; 2) make a determination that none of the candidates are usable and therefore null that pair's optimization contribution with the cost function weighting matrix; or 3) select a best inferred candidate but apply a non-binary weighting to the DOA contribution in cases where it is difficult to disambiguate the amount of error the best candidate carries.

After an initial optimization with the best inferred candidates, in some examples the localization solution may be used to compute the residual cost contribution of each DOA. An outlier analysis of the residual costs can provide evidence of DOA pairs that are most heavily impacting the localization solution, with extreme outliers flagging those DOAs to be potentially incorrect or sub-optimal. A recursive run of optimizations for outlying DOA pairs based on the residual cost contributions with the remaining candidates and with a weighting applied to that device pair's contribution may then be used for candidate handling according to one of the aforementioned three options. This is one example of a feedback process such as described above with reference to FIGS. 4-7. According to some implementations, repeated optimizations and handling decisions may be carried out until all detected candidates are evaluated and the residual cost contributions of the selected DOAs are balanced.

A drawback of candidate selection based on optimizer evaluations is that it is computationally intensive and sensitive to candidate traversal order. An alternative technique with less computational weight involves determining all permutations of candidates in the set and running a triangle alignment method for device localization on these candidates. Relevant triangle alignment methods are disclosed in U.S. Provisional Patent Application No. 62/992,068, filed on Mar. 19, 2020 and entitled "Audio Device Auto-Location," which is hereby incorporated by reference for all purposes. The localization results can then be evaluated by computing the total and residual costs the results yield with respect to the DOA candidates used in the triangulation. Decision logic to parse these metrics can be used to determine the best candidates and their respective weighting to be supplied to the non-linear optimization problem. In cases where the list of candidates is large, therefore yielding high permutation counts, filtering and intelligent traversal through the permutation list may be applied.

TOA Robustness Measures

As described above with reference to FIG. 6, the use of multiple candidate TOA solutions adds robustness over systems that utilize single or minimal TOA values, and ensures that errors have a minimal impact on finding the optimal speaker layout. Having obtained an impulse response of the system, in some examples each one of the TOA matrix elements can be recovered by searching for the peak corresponding to the direct sound. In ideal conditions (e.g., no noise, no obstructions in the direct path between source and receiver and speakers pointing directly to the microphones) this peak can be easily identified as the largest peak in the impulse response. However, in presence of noise, obstructions, or misalignment of speakers and microphones, the peak corresponding to the direct sound does not necessarily correspond to the largest value. Moreover, in such conditions the peak corresponding to the direct sound can be difficult to isolate from other reflections and/or noise. The direct sound identification can, in some instances, be a challenging process. An incorrect identification of the direct sound will degrade (and in some instances may completely spoil) the automatic localization process. Thus, in cases wherein there is the potential for error in the direct sound identification process, it can be effective to consider multiple candidates for the direct sound. In some such instances, the peak selection process may include two parts: (1) a direct sound search algorithm, which looks for suitable peak candidates, and (2) a peak candidate evaluation process to increase the probability to pick the correct TOA matrix elements.

In some implementations, the process of searching for direct sound candidate peaks may include a method to identify relevant candidates for the direct sound. Some such methods may be based on the following steps: (1) identify one first reference peak (e.g., the maximum of the absolute value of the impulse response (IR)), the "first peak;" (2) evaluate the level of noise around (before and after) this first peak; (3) search for alternative peaks before (and in some cases after) the first peak that are above the noise level; (4) rank the peaks found according to their probability of corresponding the correct TOA; and optionally (5) group close peaks (to reduce the number of candidates).

Once direct sound candidate peaks are identified, some implementations may involve a multiple peak evaluation step. As a result of the direct sound candidate peak search, in some examples there will be one or more candidate values for each TOA matrix element ranked according their estimated probability. Multiple TOA matrices can be formed by selecting among the different candidate values. In order to assess the likelihood of a given TOA matrix, a minimization process (such as the minimization process described above) may be implemented. This process can generate the residuals of the minimization, which are a good estimates of the internal coherence of the TOA and DOA matrices. A perfect noiseless TOA matrix will lead to zero residuals, whereas a TOA matrix with incorrect matrix elements will lead to large residuals. In some implementations, the method will look for the set of candidate TOA matrix elements that creates the TOA matrix with the smallest residuals. This is one example of an evaluation process described above with reference to FIGS. 6 and 7, which may involve results evaluation block 750. In one example, the evaluation process may involve performing the following steps: (1) choose an initial TOA matrix; (2) evaluate the initial matrix with the residuals of the minimization process; (3) change one matrix element of the TOA matrix from the list of TOA candidates; (4) re-evaluate the matrix with the residuals of the minimization process; (5) if the residuals are smaller accept the change, otherwise do not accept it; and (6) iterate over steps 3 to 5. In some examples, the evaluation process may stop when all TOA candidates have been evaluated or when a predefined maximum number of iterations has been reached.

Localization Method Example

Figure 9A:
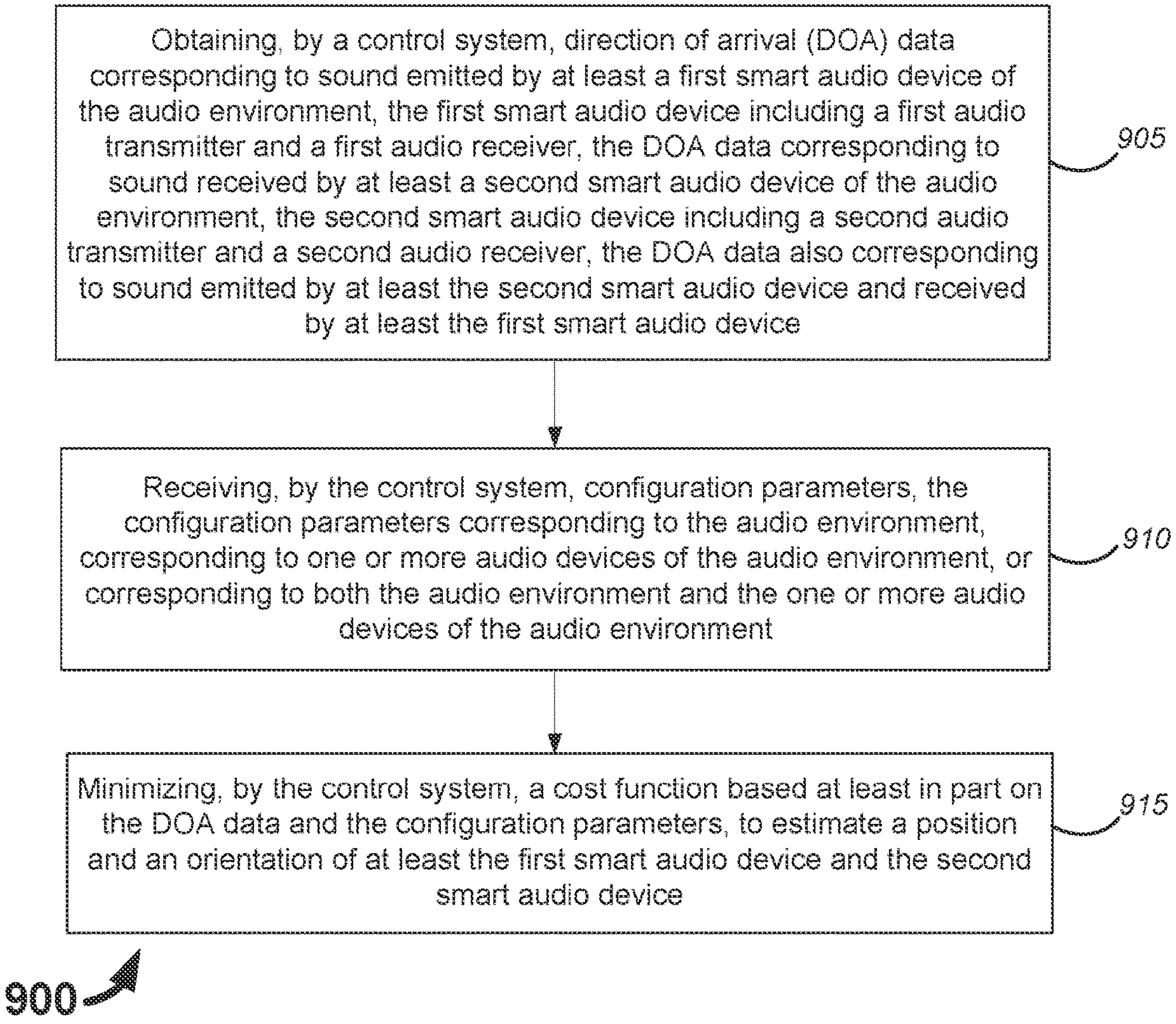
FIG. 9A is a flow diagram that outlines one example of a localization method.

FIG. 9A is a flow diagram that outlines one example of a localization method. The blocks of method 900, like other methods described herein, are not necessarily performed in the order indicated. Moreover, such methods may include more or fewer blocks than shown and/or described. In this implementation, method 900 involves estimating the locations and orientations of audio devices in an environment. The blocks of method 900 may be performed by one or more devices, which may be (or may include) the apparatus 1000 shown in FIG. 10.

In this example, block 905 obtaining, by a control system, direction of arrival (DOA) data corresponding to sound emitted by at least a first smart audio device of the audio environment. The control system may, for example, be the control system 1010 that is described below with reference to FIG. 10. According to this example, the first smart audio device includes a first audio transmitter and a first audio receiver and the DOA data corresponds to sound received by at least a second smart audio device of the audio environment. Here, the second smart audio device includes a second audio transmitter and a second audio receiver. In this example, the DOA data also corresponds to sound emitted by at least the second smart audio device and received by at least the first smart audio device. In some examples, the first and second smart audio devices may be two of the audio devices 105*a*-105*d* shown in FIG. 1.

The DOA data may be obtained in various ways, depending on the particular implementation. In some instances, determining the DOA data may involve one or more of the DOA-related methods that are described above with reference to FIG. 4 and/or in the "DOA Robustness Measures" section. Some implementations may involve obtaining, by the control system, one or more elements of the DOA data using a beamforming method, a steered powered response method, a time difference of arrival method and/or a structured signal method.

According to this example, block 910 involves receiving, by the control system, configuration parameters. In this implementation, the configuration parameters correspond to the audio environment itself, to one or more audio devices of the audio environment, or to both the audio environment and the one or more audio devices of the audio environment. According to some examples, the configuration parameters may indicate a number of audio devices in the audio environment, one or more dimensions of the audio environment, one or more constraints on audio device location or orientation and/or disambiguation data for at least one of rotation, translation or scaling. In some examples, the configuration parameters may include playback latency data, recording latency data and/or data for disambiguating latency symmetry.

In this example, block 915 involves minimizing, by the control system, a cost function based at least in part on the DOA data and the configuration parameters, to estimate a position and an orientation of at least the first smart audio device and the second smart audio device.

According to some examples, the DOA data also may correspond to sound emitted by third through $N^{th}$ smart audio devices of the audio environment, where N corresponds to a total number of smart audio devices of the audio environment. In such examples, the DOA data also may correspond to sound received by each of the first through $N^{th}$ smart audio devices from all other smart audio devices of the audio environment. In such instances, minimizing the cost function may involve estimating a position and an orientation of the third through $N^{th}$ smart audio devices.

In some examples, the DOA data also may correspond to sound received by one or more passive audio receivers of the audio environment. Each of the one or more passive audio receivers may include a microphone array, but may lack an audio emitter. Minimizing the cost function may also provide an estimated location and orientation of each of the one or more passive audio receivers. According to some examples, the DOA data also may correspond to sound emitted by one or more audio emitters of the audio environment. Each of the one or more audio emitters may include at least one sound-emitting transducer but may lack a microphone array. Minimizing the cost function also may provide an estimated location of each of the one or more audio emitters.

In some examples, method 900 may involve receiving, by the control system, a seed layout for the cost function. The seed layout may, for example, specify a correct number of audio transmitters and receivers in the audio environment and an arbitrary location and orientation for each of the audio transmitters and receivers in the audio environment.

According to some examples, method 900 may involve receiving, by the control system, a weight factor associated with one or more elements of the DOA data. The weight factor may, for example, indicate the availability and/or the reliability of the one or more elements of the DOA data.

In some examples, method 900 may involve receiving, by the control system, time of arrival (TOA) data corresponding to sound emitted by at least one audio device of the audio environment and received by at least one other audio device of the audio environment. In some such examples, the cost function may be based, at least in part, on the TOA data. Some such implementations may involve estimating at least one playback latency and/or at least one recording latency. According to some such examples, the cost function may operate with a rescaled position, a rescaled latency and/or a rescaled time of arrival.

In some examples, the cost function may include a first term depending on the DOA data only and second term depending on the TOA data only. In some such examples, the first term may include a first weight factor and the second term may include a second weight factor. According to some such examples, one or more TOA elements of the second term may have a TOA element weight factor indicating the availability or reliability of each of the one or more TOA elements.

Figure 9B:
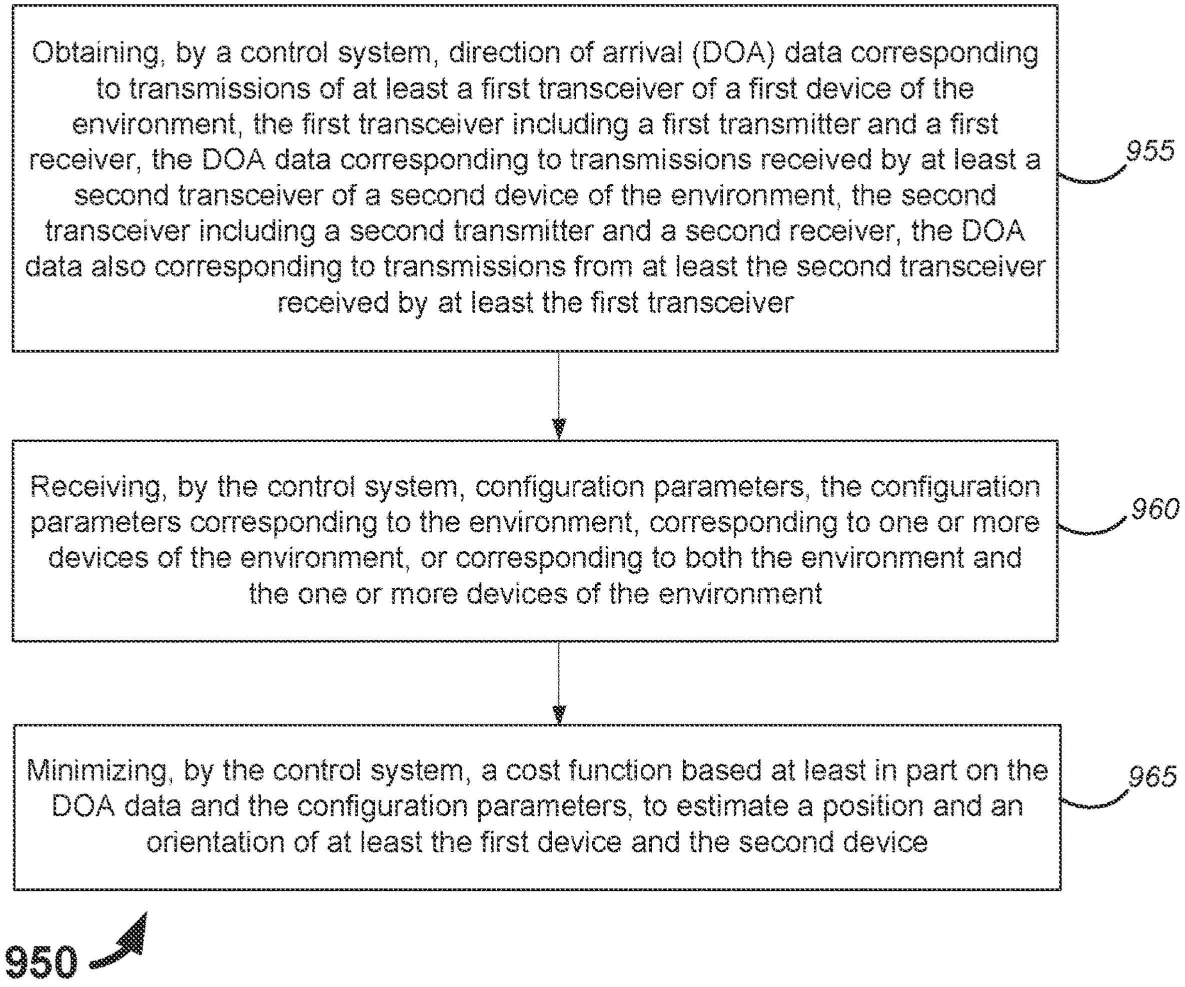
FIG. 9B is a flow diagram that outlines another example of a localization method.

FIG. 9B is a flow diagram that outlines another example of a localization method. The blocks of method 950, like other methods described herein, are not necessarily performed in the order indicated. Moreover, such methods may include more or fewer blocks than shown and/or described. In this implementation, method 950 involves estimating the locations and orientations of devices in an environment. The blocks of method 950 may be performed by one or more devices, which may be (or may include) the apparatus 1000 shown in FIG. 10.

In this example, block 955 obtaining, by a control system, direction of arrival (DOA) data corresponding to transmissions of at least a first transceiver of a first device of the environment. The control system may, for example, be the control system 1010 that is described below with reference to FIG. 10. According to this example, the first transceiver includes a first transmitter and a first receiver and the DOA data corresponds to transmissions received by at least a second transceiver of a second device of the environment, the second transceiver also including a second transmitter and a second receiver. In this example, the DOA data also corresponds to transmissions from at least the second transceiver received by at least the first transceiver. According to some examples, the first transceiver and the second transceiver may be configured for transmitting and receiving electromagnetic waves. In some examples, the first and second smart audio devices may be two of the audio devices 105*a*-105*d* shown in FIG. 1.

The DOA data may be obtained in various ways, depending on the particular implementation. In some instances, determining the DOA data may involve one or more of the DOA-related methods that are described above with reference to FIG. 4 and/or in the "DOA Robustness Measures" section. Some implementations may involve obtaining, by the control system, one or more elements of the DOA data using a beamforming method, a steered powered response method, a time difference of arrival method and/or a structured signal method.

According to this example, block 960 involves receiving, by the control system, configuration parameters. In this implementation, the configuration parameters correspond to the environment itself, to one or more devices of the audio environment, or to both the environment and the one or more devices of the audio environment. According to some examples, the configuration parameters may indicate a number of audio devices in the environment, one or more dimensions of the environment, one or more constraints on device location or orientation and/or disambiguation data for at least one of rotation, translation or scaling. In some examples, the configuration parameters may include playback latency data, recording latency data and/or data for disambiguating latency symmetry.

In this example, block 965 involves minimizing, by the control system, a cost function based at least in part on the DOA data and the configuration parameters, to estimate a position and an orientation of at least the first device and the second device.

According to some implementations, the DOA data also may correspond to transmissions emitted by third through $N^{th}$ transceivers of third through $N^{th}$ devices of the environment, where N corresponds to a total number of transceivers of the environment and where the DOA data also corresponds to transmissions received by each of the first through $N^{th}$ transceivers from all other transceivers of the environment. In some such implementations, minimizing the cost function also may involve estimating a position and an orientation of the third through $N^{th}$ transceivers.

In some examples, the first device and the second device may be smart audio devices and the environment may be an audio environment. In some such examples, the first transmitter and the second transmitter may be audio transmitters. In some such examples, the first receiver and the second receiver may be audio receivers. According to some such examples, the DOA data also may correspond to sound emitted by third through $N^{th}$ smart audio devices of the audio environment, where N corresponds to a total number of smart audio devices of the audio environment. In such examples, the DOA data also may correspond to sound received by each of the first through $N^{th}$ smart audio devices from all other smart audio devices of the audio environment. In such instances, minimizing the cost function may involve estimating a position and an orientation of the third through $N^{th}$ smart audio devices. Alternatively, or additionally, in some examples the DOA data may correspond to electromagnetic waves emitted and received by devices in the environment.

In some examples, the DOA data also may correspond to sound received by one or more passive receivers of the environment. Each of the one or more passive receivers may include a receiver array, but may lack a transmitter. Minimizing the cost function may also provide an estimated location and orientation of each of the one or more passive receivers. According to some examples, the DOA data also may correspond to transmissions from one or more transmitters of the environment. In some such examples, each of the one or more transmitters may lack a receiver array. Minimizing the cost function also may provide an estimated location of each of the one or more transmitters.

In some examples, method 950 may involve receiving, by the control system, a seed layout for the cost function. The seed layout may, for example, specify a correct number of transmitters and receivers in the audio environment and an arbitrary location and orientation for each of the transmitters and receivers in the audio environment.

According to some examples, method 950 may involve receiving, by the control system, a weight factor associated with one or more elements of the DOA data. The weight factor may, for example, indicate the availability and/or the reliability of the one or more elements of the DOA data.

In some examples, method 950 may involve receiving, by the control system, time of arrival (TOA) data corresponding to sound emitted by at least one audio device of the audio environment and received by at least one other audio device of the audio environment. In some such examples, the cost function may be based, at least in part, on the TOA data. Some such implementations may involve estimating at least one playback latency and/or at least one recording latency. According to some such examples, the cost function may operate with a rescaled position, a rescaled latency and/or a rescaled time of arrival.

In some examples, the cost function may include a first term depending on the DOA data only and second term depending on the TOA data only. In some such examples, the first term may include a first weight factor and the second term may include a second weight factor. According to some such examples, one or more TOA elements of the second term may have a TOA element weight factor indicating the availability or reliability of each of the one or more TOA elements.

FIG. 10 is a block diagram that shows examples of components of an apparatus capable of implementing various aspects of this disclosure. The apparatus 1000 may, for example, be configured to perform the methods described above with reference to FIGS. 9A and/or 9B. According to some examples, the apparatus 1000 may be, or may include, a smart audio device (such as a smart speaker) that is configured for performing at least some of the methods disclosed herein. In other implementations, the apparatus 1000 may be, or may include, another device that is configured for performing at least some of the methods disclosed herein. In some such implementations the apparatus 1000 may be, or may include, a smart home hub or a server.

In this example, the apparatus 1000 includes an interface system 1005 and a control system 1010. The interface system 1005 may, in some implementations, be configured for receiving input from each of a plurality of microphones in an environment. The interface system 1005 may include one or more network interfaces and/or one or more external device interfaces (such as one or more universal serial bus (USB) interfaces). According to some implementations, the interface system 1005 may include one or more wireless interfaces. The interface system 1005 may include one or more devices for implementing a user interface, such as one or more microphones, one or more loudspeakers, a display system, a touch sensor system and/or a gesture sensor system. In some examples, the interface system 1005 may include one or more interfaces between the control system 1010 and a memory system, such as the optional memory system 1015 shown in FIG. 10. However, the control system 1010 may include a memory system.

The control system 1010 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the control system 1010 may reside in more than one device. For example, a portion of the control system 1010 may reside in a device within the audio environment 100 that is depicted in FIG. 1 (such as one of the audio devices 105*a*-105*d* or a smart home hub), and another portion of the control system 1010 may reside in a device that is outside the audio environment 100, such as a server, a mobile device (e.g., a smartphone or a tablet computer), etc. The interface system 1005 also may, in some such examples, reside in more than one device.

In some implementations, the control system 1010 may be configured for performing, at least in part, the methods disclosed herein. According to some examples, the control system 1010 may be configured for implementing the methods described above, e.g., with reference to FIGS. 4-9B.

In some examples, the apparatus 1000 may include the optional microphone system 1020 that is depicted in FIG. 10. The microphone system 1020 may include one or more microphones. In some examples, the microphone system 1020 may include an array of microphones. In some examples, the apparatus 1000 may include the optional loudspeaker system 1025 that is depicted in FIG. 10. The loudspeaker system 1025 may include one or more loudspeakers. In some examples, the microphone system 1020 may include an array of loudspeakers. In some such examples the apparatus 1000 may be, or may include, an audio device. For example, the apparatus 1000 may be, or may include, one of the audio devices 105*a*-105*d* shown in FIG. 1.

In some examples, the apparatus 1000 may include the optional antenna system 1030 that is shown in FIG. 10. According to some examples, the antenna system 1030 may include an array of antennas. In some examples, the antenna system 1030 may be configured for transmitting and/or receiving electromagnetic waves. According to some implementations, the control system 1010 may be configured to estimate the distance between two audio devices in an environment based on antenna data from the antenna system 1030. For example, the control system 1010 may be configured to estimate the distance between two audio devices in an environment according to the direction of arrival of the antenna data and/or the received signal strength of the antenna data.

Some or all of the methods described herein may be performed by one or more devices according to instructions (e.g., software) stored on one or more non-transitory media. For example, some or all of the methods described herein may be performed by the control system 1010 according to instructions stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 1015 shown in FIG. 10 and/or in the control system 1010. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 1010 of FIG. 10.

Figure 11:
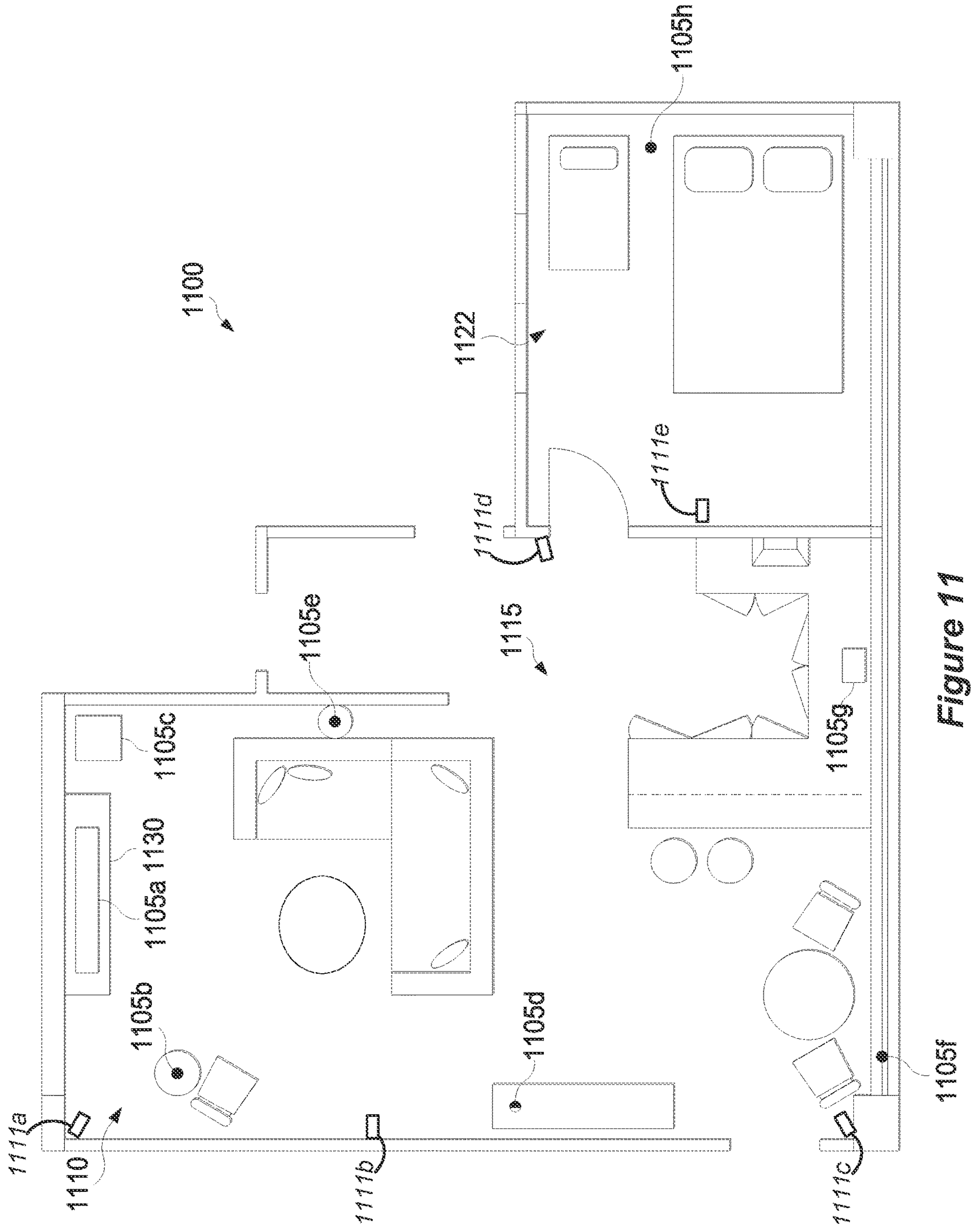
FIG. 11 shows an example of a floor plan of an audio environment, which is a living space in this example.

FIG. 11 shows an example of a floor plan of an audio environment, which is a living space in this example. As with other figures provided herein, the types and numbers of elements shown in FIG. 11 are merely provided by way of example. Other implementations may include more, fewer and/or different types and numbers of elements.

According to this example, the environment 1100 includes a living room 1110 at the upper left, a kitchen 1115 at the lower center, and a bedroom 1122 at the lower right. Boxes and circles distributed across the living space represent a set of loudspeakers 1105*a*-1105*h*, at least some of which may be smart speakers in some implementations, placed in locations convenient to the space, but not adhering to any standard prescribed layout (arbitrarily placed). In some examples, the television 1130 may be configured to implement one or more disclosed embodiments, at least in part. In this example, the environment 1100 includes cameras 1111*a*-1111*e*, which are distributed throughout the environment. In some implementations, one or more smart audio devices in the environment 1100 also may include one or more cameras. The one or more smart audio devices may be single purpose audio devices or virtual assistants. In some such examples, one or more cameras of the optional sensor system 130 may reside in or on the television 1130, in a mobile phone or in a smart speaker, such as one or more of the loudspeakers 1105*b*, 1105*d*, 1105*e* or 1105*h*. Although cameras 1111*a*-1111*e* are not shown in every depiction of the environment 1100 presented in this disclosure, each of the environments 1100 may nonetheless include one or more cameras in some implementations.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments and applications of the disclosure have been described herein, it will be apparent to those of ordinary skill in the art that many variations on the embodiments and applications described herein are possible without departing from the scope of this disclosure.

The invention claimed is:

1. A method for localizing audio devices in an audio environment, the method comprising:

obtaining, by a control system, direction of arrival (DOA) data corresponding to sound emitted by at least a first smart audio device of the audio environment, the first smart audio device including a first audio transmitter and a first audio receiver, the DOA data corresponding to sound received by at least a second smart audio device of the audio environment, the second smart audio device including a second audio transmitter and a second audio receiver, the DOA data also corresponding to sound emitted by at least the second smart audio device and received by at least the first smart audio device;

receiving, by the control system, configuration parameters, the configuration parameters corresponding to the audio environment, corresponding to one or more audio devices of the audio environment, or corresponding to both the audio environment and the one or more audio devices of the audio environment; and minimizing, by the control system, a cost function based at least in part on the DOA data and the configuration parameters, to estimate a position and an orientation of at least the first smart audio device and the second smart audio device.

2. The method of claim 1, wherein the DOA data also corresponds to sound received by one or more passive audio receivers of the audio environment, each of the one or more passive audio receivers including a microphone array but lacking an audio emitter, and wherein minimizing the cost function also provides an estimated location and orientation of each of the one or more passive audio receivers.

3. The method of claim 1, wherein the DOA data also corresponds to sound emitted by one or more audio emitters of the audio environment, each of the one or more audio emitters including at least one sound-emitting transducer but lacking a microphone array, and wherein minimizing the cost function also provides an estimated location of each of the one or more audio emitters.

4. The method of claim 1, wherein the DOA data also corresponds to sound emitted by third through $N^{th}$ smart audio devices of the audio environment, N corresponding to a total number of smart audio devices of the audio environment, wherein the DOA data also corresponds to sound received by each of the first through $N^{th}$ smart audio devices from all other smart audio devices of the audio environment and wherein minimizing the cost function involves estimating a position and an orientation of the third through $N^{th}$ smart audio devices.

5. The method of claim 1, wherein the configuration parameters include at least one of a number of audio devices in the audio environment, one or more dimensions of the audio environment, one or more constraints on audio device location or orientation, or disambiguation data for at least one of rotation, translation or scaling.

6. The method of claim 1, further comprising receiving, by the control system, a seed layout for the cost function, the seed layout specifying a correct number of audio transmitters and receivers in the audio environment and an arbitrary location and orientation for each of the audio transmitters and receivers in the audio environment.

7. The method of claim 1, further comprising receiving, by the control system, a weight factor associated with one or more elements of the DOA data, the weight factor indicating at least one of the availability or reliability of the one or more elements.

8. The method of claim 1, further comprising obtaining, by the control system, one or more elements of the DOA data using at least one of a beamforming method, a steered powered response method, a time difference of arrival method or a structured signal method.

9. The method of claim 1, further comprising receiving, by the control system, time of arrival (TOA) data corresponding to sound emitted by at least one audio device of the audio environment and received by at least one other audio device of the audio environment and wherein the cost function is based at least in part on the TOA data.

10. The method of claim 9, further comprising estimating at least one playback latency, estimating at least one recording latency, or estimating at least one playback latency and at least one recording latency.

11. The method of claim 10, wherein the cost function operates with at least one of a rescaled position, a rescaled latency or a rescaled time of arrival.

12. The method of claim 9, wherein the cost function includes a first term depending on the DOA data only and second term depending on the TOA data only.

13. The method of claim 12, wherein the first term includes a first weight factor and wherein the second term includes a second weight factor.

14. The method of claim 12, wherein one or more TOA elements of the second term has a TOA element weight factor indicating the availability or reliability of each of the one or more TOA elements.

15. The method of claim 1, wherein the configuration parameters include at least one of: playback latency data; recording latency data; data for disambiguating latency symmetry; disambiguation data for rotation; disambiguation data for translation; or disambiguation data for scaling.

16. An apparatus comprising:

a control system configured to:

obtain direction of arrival (DOA) data corresponding to sound emitted by at least a first smart audio device of the audio environment, the first smart audio device including a first audio transmitter and a first audio receiver, the DOA data corresponding to sound received by at least a second smart device of the audio environment, the second smart audio device including a second audio transmitter and a second audio receiver, the DOA data also corresponding to sound emitted by at least the second smart audio device and received by at least the first smart audio device, receive configuration parameters, the configuration parameters corresponding to the audio environment, corresponding to one or more audio devices of the audio environment, or corresponding to both the audio environment and the one or more audio devices of the audio environment, and minimize a cost function based at least in part on the DOA data and the configuration parameters, to estimate a position and an orientation of at least the first smart audio device and the second smart audio device.

17. A non-transitory computer readable medium containing instructions that when executed by a processor perform the method of claim 1.

* * * * *